United States Patent [19]

Beaupre et al.

[11] 4,071,711

[45] Jan. 31, 1978

[54] TELEPHONE SUBSCRIBER DISTRIBUTION SYSTEM

[75] Inventors: Donald M. Beaupre, Beaconsfield; Harold A. Ferris, St. Eugene, both of Canada

[73] Assignee: Farinon Electric of Canada Ltd., Montreal, Canada

[21] Appl. No.: 588,691

[22] Filed: June 20, 1975

Related U.S. Application Data

[63] Continuation-in-part of Ser. No. 494,305, Aug. 2, 1974.

[51] Int. Cl.$^2$ .............................................. H04J 3/12
[52] U.S. Cl. ............................ 179/41 A; 179/15 AL; 79/15 BZ; 343/176
[58] Field of Search .......... 179/15 AL, 15 AW, 15 A, 179/15 BA, 15 BM, 15 BZ, 41 A; 325/4, 39, 47, 142, 302, 324; 343/176

[56] References Cited

U.S. PATENT DOCUMENTS

| | | | |
|---|---|---|---|
| 3,529,089 | 9/1970 | Davis | 179/15 AL |
| 3,562,432 | 2/1971 | Gabbard | 179/15 BS |
| 3,751,595 | 8/1973 | Moses | 179/15 AL |
| 3,757,050 | 9/1973 | Mizote | 179/15 AL |
| 3,786,418 | 1/1974 | Nick | 179/15 AL |
| 3,804,986 | 4/1974 | Wakamatsu | 179/15 AL |
| 3,922,496 | 11/1975 | Gabbard | 179/15 BS |

*Primary Examiner*—David L. Stewart
*Attorney, Agent, or Firm*—Gowling & Henderson

[57] ABSTRACT

This invention relates to a multi-point information distribution system useful for telephone service, data connecting systems and other applications which permits a central station to service a plurality of outlying stations, through transmission media such as radio waves or wire cables, in privacy and using only one transmitting medium such as a first transmitting carrier frequency and one separate receiving medium such as a different receiving carrier frequency. The transmission media couples selected input connection points to selected terminating circuit devices one at a time. In accordance with the invention, the content on input connecting ports from a community dial office or other central system is time sampled at the central station which then transmits a sequentially ordered sample stream. Each terminating circuit or device is adapted to receive the content of only one time slot, and to transmit only during a coordinated and synchronized time slot. The transmissions of the terminating circuits or devices form a sequentially ordered sample stream at the central station receiver which also contains means for distributing the samples into their appropriate central connecting ports. In one embodiment, where the number of outlying terminating circuits is less than or equal to the number of ordered time slots, a separate time slot, and its associated connecting port, is dedicated to each terminating circuit. In a second embodiment, which can service a plurality of outlying terminating circuits greater than the number of ordered time slots, access between any outlying terminating circuit and any time slot is random. The second embodiment uses a traffic control logic means which polls the terminating circuits and assigns time slots to connecting ports and terminating circuits as required.

14 Claims, 11 Drawing Figures

TELEPHONE SUBSCRIBER DISTRIBUTION SYSTEM

CROSS-REFERENCE TO RELATED APPLICATIONS

This application is a Continuation-In-Part of application Ser. No. 494,305, filed Aug. 2, 1974.

BACKGROUND OF THE INVENTION

1. Field of the Invention

This invention relates to an information distribution system. More specifically, this invention relates to such a system wherein, with the use of only a single transmitting medium, such as a first transmitting carrier frequency, and a single receiving medium, such as a second indifferent receiving carrier frequency, it is possible to service a plurality of outlying stations with a unique and private circuit for any such station.

2. Description of the Prior Art

In one application it is often necessary to provide telephone service to subscribers who are geographically located at points sufficiently remote from a Community Dial Office (CDO) so that the installation of cable for this purpose alone is impractical or not economically feasible. In such cases, telephone service is sometimes provided by radio links from the CDO to the subscribers. If a single frequency non-multiplexed system is used to service a plurality of subscribers, then only one subscriber can use the system at any time. In addition, there is a lack of privacy under these conditions. To overcome these disadvantages, systems are sometimes provided wherein each subscriber station has its own transmitting carrier frequency and (a different) receiving carrier frequency. In this way, it is possible for the base station to service more than one subscriber at a time, and each subscriber loop has privacy relative to the other subscriber loops. Another way to accomplish this end is to use this technique in combination with frequency division multiplex systems.

However, with the second described system, the central station must have as a separate receiver for each outlying station frequency (each subscriber loop), so that the cost of equipment is high, and the use of a plurality of frequencies imposes additional pressures on already overloaded frequency bands. In the version of the systems using a combination of frequency division multiplexing of a transmitted carrier from the central office, some economy of frequencies is achieved but each outlying station must be assigned one frequency division multiplex channel and one return radio frequency so that possibilities of random access still does not exist and utilization of any individual frequency or portion of the scarce radio frequency spectrum is very poor.

SUMMARY OF THE INVENTION

These and other disadvantages are overcome with the inventive system which permits servicing of a plurality of outlying stations (telephone subscribers in this example) with the use of only one transmitting medium such as a transmitting carrier frequency and only one receiving medium such as a different receiving carrier frequency, while still providing a unique and private circuit for each outlying station. It is important to note that the plurality of outlying stations may share and separately utilize the system in an adaptive and as required manner, thus providing maximum utilization of the two carriers required.

In a specific embodiment it is possible to service a greater plurality of outlying stations than the plurality of circuits derived from the two radio frequency carriers.

In accordance with the invention a multi-point information distribution system comprising a central station and a plurality of physically separated outlying stations, each outlying station comprising at least one terminating circuit, whereby said system comprises a plurality of terminating circuits, each said central station comprising a plurality of connecting ports, and means for coupling selected ones of said connecting ports to selected ones of said terminating circuits one at a time; characterised in that said coupling means comprises means at said central station for time sampling contents of said connecting ports in an ordered sequence during cyclically recurring time slots to provide, at an output of said time sampling means, a first sequentially ordered sample stream; transmission means at said central station for sending said sample stream directly and in common to each outlying station on a first medium whereby identical sample streams are sent to each outlying station; receiving means at each said outlying stations adapted to receive said sample streams; control means at each said outlying station coupled to said receiving means to permit only samples in a preselected time slot to be applied to terminating circuits at said outlying stations; transmission means at each said central station and means for providing a signal to said transmission means; said control means comprising means for gating said transmission means only during the time slots of their respective terminating circuits to thereby provide samples of said signal, whereby each outlying station transmits, on a second medium, samples of the signals provided to their respective transmitting means; said outlying station comprising means for arranging the transmission time slots at each station relative to one another so that samples will arrive at a receiving means of said central station in a second sequentially ordered sample stream; and, distributor means at said central station connected to an output of said receiving means and adopted to distribute said time distributed samples onto their respective connecting ports.

BRIEF DESCRIPTION OF THE DRAWINGS

The invention will be better understood by an examination of the following description together with the accompanying drawings in which.

DETAILED DESCRIPTION OF THE DRAWINGS

In all of the drawings the embodiment is shown but not limited to radio waves. Other embodiments are intended to allow the transmission medium to be wire pairs, coaxial cable, modulated light or other suitable means. The essence of the invention is not intended to be confined to a specific medium of transmission. As one example in the embodiment wherein the invention utilizes wire pairs or coaxial cable, the attennae would be replaced by suitable connecting terminals, and the carrier frequencies would be absent or different than the analagous radio carrier frequencies illustrated.

Similarly, the embodiments illustrated in the figures are related but not limited to telephone service. Other similar systems may be illustrated to provide collection of data and condition reports from scattered metering devices or industrial installations, to provide data transmission between computer installations, to provide printing telegraph service and to provide any other types of communications between scattered outlying stations and a control terminal.

Figure 1:
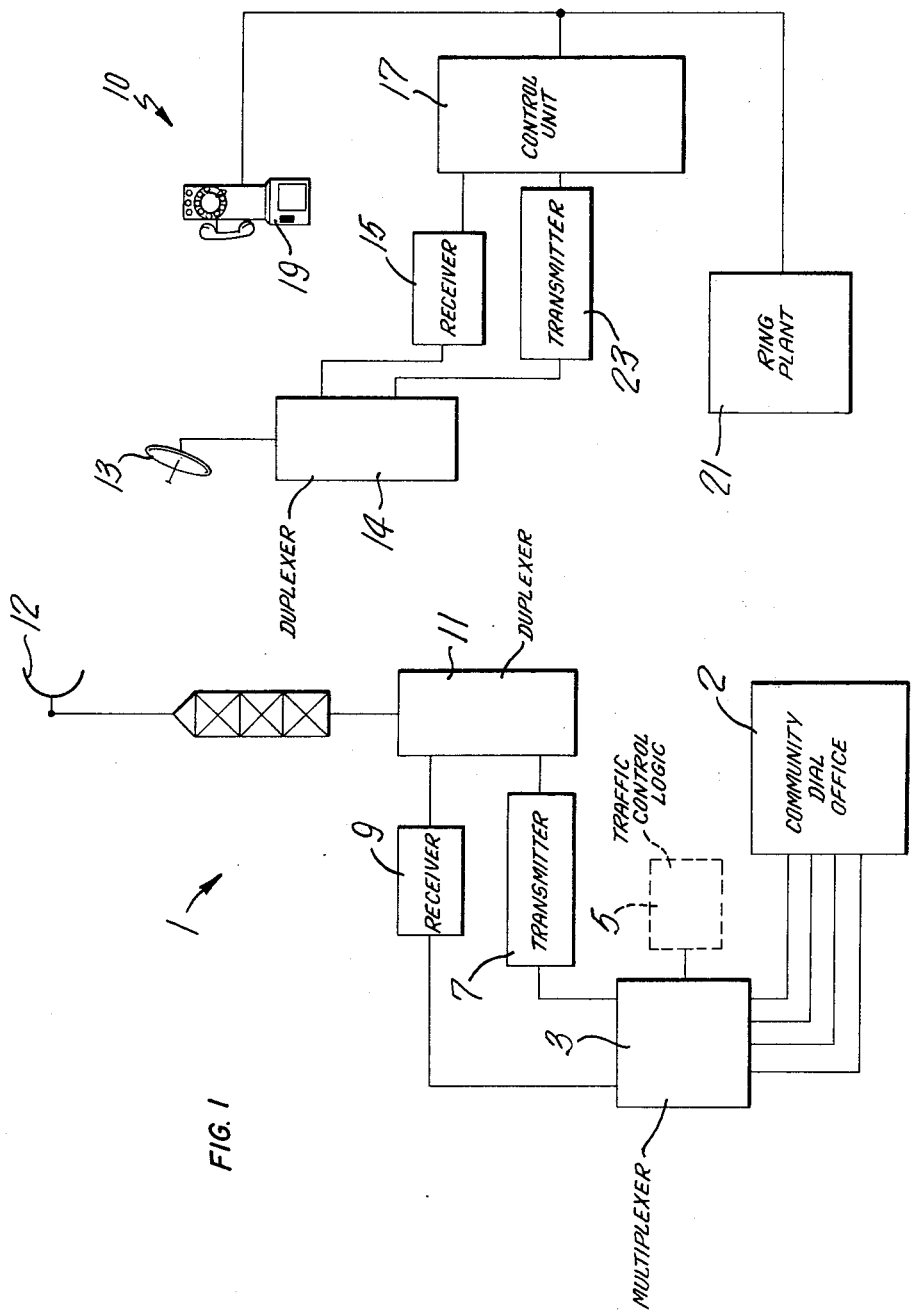
FIG. 1 is a general block diagram of a system in accordance with the invention and the specific embodiment wherein the invention may be used to provide telephone service.

Referring now to FIG. 1, the central station of the system, indicated generally at 1 is associated with a CDO 2, which may be any other type of information center, and includes a multiplex unit 3, which, in one embodiment of the invention is under the control of a Traffic Control Logic (TCL) unit 5. The output of the multiplex unit is fed to a radio transmitter 7 and the output of the transmitter is fed, via a duplexer 11, which, as is well known in the art, separates and directs transmitted and received signals, to an antenna 12. The carrier frequency $f_1$ of the transmitter can be any of the frequencies allocated for this purpose by governmental authorities. It is expected that, in Canada, this will be in the 1400 to 1500 MHz range, although technically the system could be used on any part of the radio spectrum where carriers are available.

The base station receives incoming signals at a separate frequency $f_2$, which could be in the same bands as described for the transmitting frequency. The incoming signal is picked up by the antenna 12 and routed, by the duplexer 11, to the receiver 9. The output of the receiver is fed to the CDO via the multiplexer 3. In addition, certain data may be fed to the TCL 5.

In accordance with the invention, a plurality of information signals will be presented in parallel to the multiplexer from the CDO (through peripheral equipment where necessary) and the parallel signals will be time sampled in sequence to provide a stream of ordered samples at the output of the multiplexer. The periodically recurring sampling time slots can then be assigned, one at a time, to pre-selected subscriber stations. Thus, the time slots are analogous to time channels, and each such time channel can bridge the space gap between a connecting port at the central station and a terminating circuit at the outlying station. A system loop consists of any one of the central office connecting ports bridged to any one of the outlying terminating circuits by a time channel. Each loop circuit is sampled every "$m$" microseconds and each loop circuit is sampled for an equal length of time during each cycle, i.e. $m/n$ microseconds, where $n$ is the number of time slots. The sampling is, of course, continuous, and the continuous ordered stream modulates the one carrier frequency $f_1$. It will, of course, be clear that the number of channels (time slots) corresponds with the number of loop circuits.

As will be apparent, the operation, at the central station end, is a TDM system i.e. the output of the $n$ channels is time divided, and the time divided samples are combined to provide a continuous stream which is then transmitted.

However, in a conventional TDM system, both receiving and transmitting ends of the system each comprises a single physical entity. As will be seen, in accordance with the invention, a single central station will service a plurality of physically separated outlying stations. In one embodiment of the invention, the number of outlying stations is equal to, or less than, the number of channels in the system. In this embodiment, each of the channels is dedicated to a predetermined outlying station. In a further embodiment, the number of outlying stations is greater than the number of channels. In the further embodiment, at least some of the channels are not dedicated, and access between an undedicated channel and outlying stations is random.

Returning now to FIG. 1, the system further comprises an outlying station, indicated generally at 10. It will be clear from the above description that the system contains a plurality of physically separated outlying stations, however as all of the stations can be identical, only one is shown in the drawings. Each outlying station comprises an antenna 13 and a duplexer 14. In addition, each outlying station comprises a receiver portion 15 and a transmitter portion 23. As will be apparent, the receiver portion of each outlying station will be tuned to the frequency $f_1$, and the transmitter transmits at the frequency $f_2$. Each outlying station further includes a control unit 17, and in the embodiment shown for telephone service, at least one telephone set 19 and a ring plant 21.

It is noted that each outlying station may be associated with more than one terminating circuit. A terminating circuit may consist of either a private line, or all of the telephones in a multi party line, a pay phone line, or any other device required by the system.

The control unit at each terminating circuit contains logic circuitry which operates gating circuitry to allow information to be received only in the correct time slot (i.e. on the current channel) and to enable the transmitter portion of the station only at the right time and for the correct duration of time, as will be seen below.

The preferred embodiment of the invention comprises but is not limited to 16 channels, and the remainder of the description will relate to such a 16 channel system although it is quite apparent that more or less than 16 channels could be employed.

Figure 2:
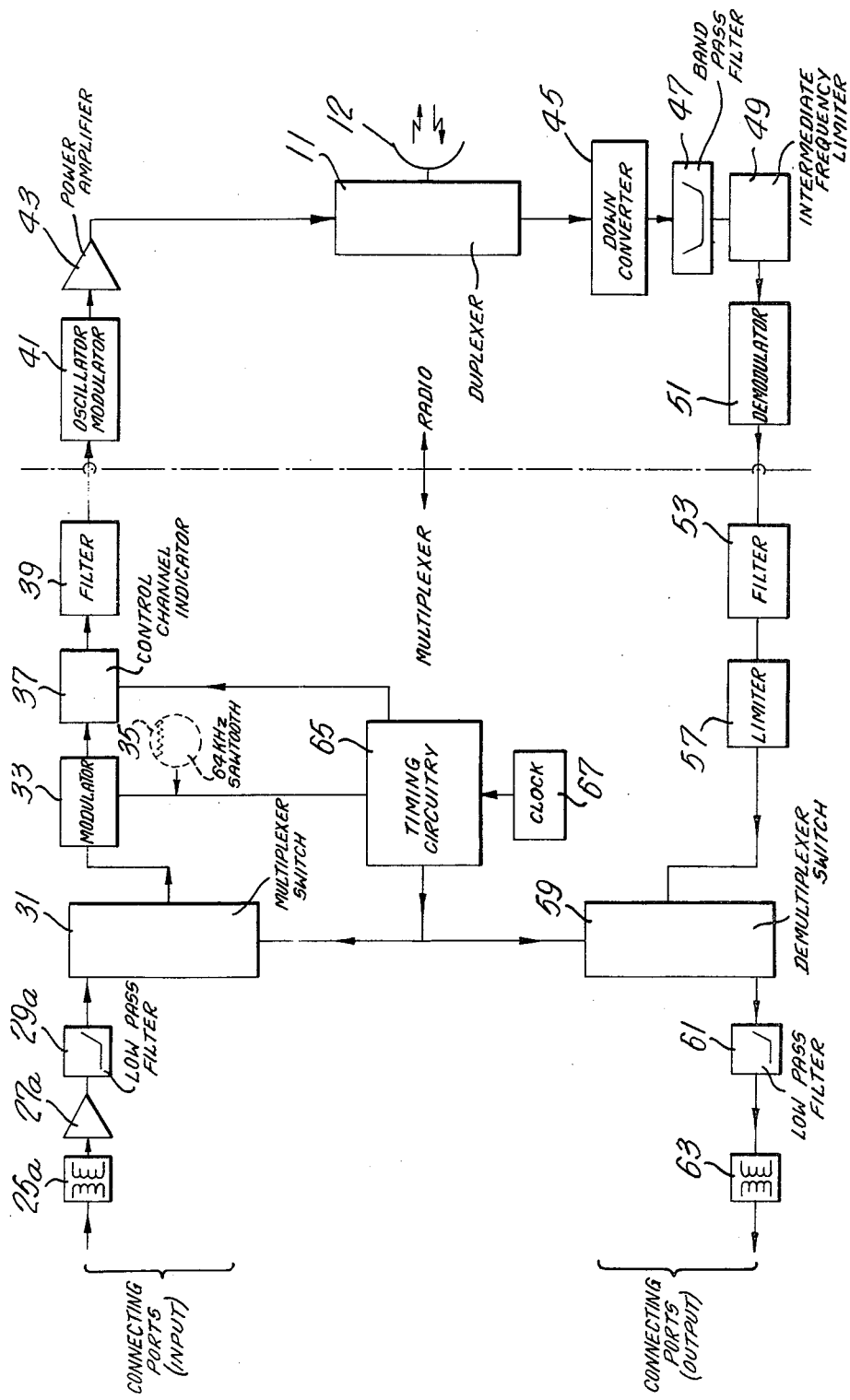
FIG. 2 illustrates, in block diagram form, a preferred embodiment of the multiplexer of the system in a specific embodiment wherein the system may be used to communicate speech, music or other periodic information.

Referring now to FIG. 2, the multiplexer comprises one channel per input connecting port, only one of which is shown in the drawing. The connecting ports can comprise the outputs of a CDO interface unit, as will be discussed in relation to FIG. 5. Each input connecting port in a telephone application comprises a port of a hybrid 25 which converts the 2 wire telephone signal to a 4 wire signal necessary for radio transmission or for carrying over a cable. The output of the hybrid is amplified in amplifier 27 and filtered in LPF 29. The output of the LPF is fed to the multiplex switch unit 31 where the input information is sampled for equal periods of time during equal length cycles. In the preferred embodiment, each input connecting port is sampled once every 125 usec for a period of 7.8 usec.

The sampled outputs are fed, in a continuous stream, to the modulation terminal of modulator means 33. If a pulse width modulation scheme is used, a sawtooth or triangular wave generator 35 would be connected to a second terminal of the modulator 33 as is well known in the art. PWM is the preferred modulation scheme, however, it will be obvious that other modulation schemes could be used without departing from the spirit of the invention.

The output of the modulator is fed to a filter 39 through a control channel indicator generator 37 the function of which will be discussed below. The modulation signal is then fed to an RF oscillator and modulator 41 of well known construction, and the output of 41 is amplified in the power amplifier 43 and thence fed to the antenna 12 through the duplexer 11. As can be seen, the items 41, 43 and 11 are in the radio section of the central station.

Received signals are fed, from the duplexer 11, to a down converter 45 (to convert the carrier from an RF to an intermediate frequency), a BPF 47, IF limiter 49 and demodulator 51 in the radio section of the central station. The output of the demodulator is fed to a filter 53 and through limiter 57 to the demultiplex switch 59 where the signal is distributed over the appropriate ones of the output connecting ports, each of which contains an LPF 61 and a part of the 4-2 hybrid 63. The two wire output of the hybrid, constitutes the received voice intelligence for telephone service.

Although two separate sets of circuit ports are shown in the drawings, in the physical situation, it may be the same set of 4 wire terminals which are connected at corresponding terminals of both the multiplexer and the demultiplexer. Thus, the input and output loop circuits, while different conceptual elements, are the same physical elements. The drawing illustrates that the system provides separate go and return channels which are normally but not limited to coordinated information. Timing circuitry 65, which receives a clock input from clock means 67, controls the timing of the multiplex and demultiplex switch units 31 and 59 respectively, and it also controls the timing of the modulator means 33 and the control channel indicator generator means. In the preferred embodiment, the control channel indicator is simply an "exalted" pulse, i.e. a pulse of greater amplitude than the other pulses of the system. Obviously, other indicators could be used.

Figure 3:
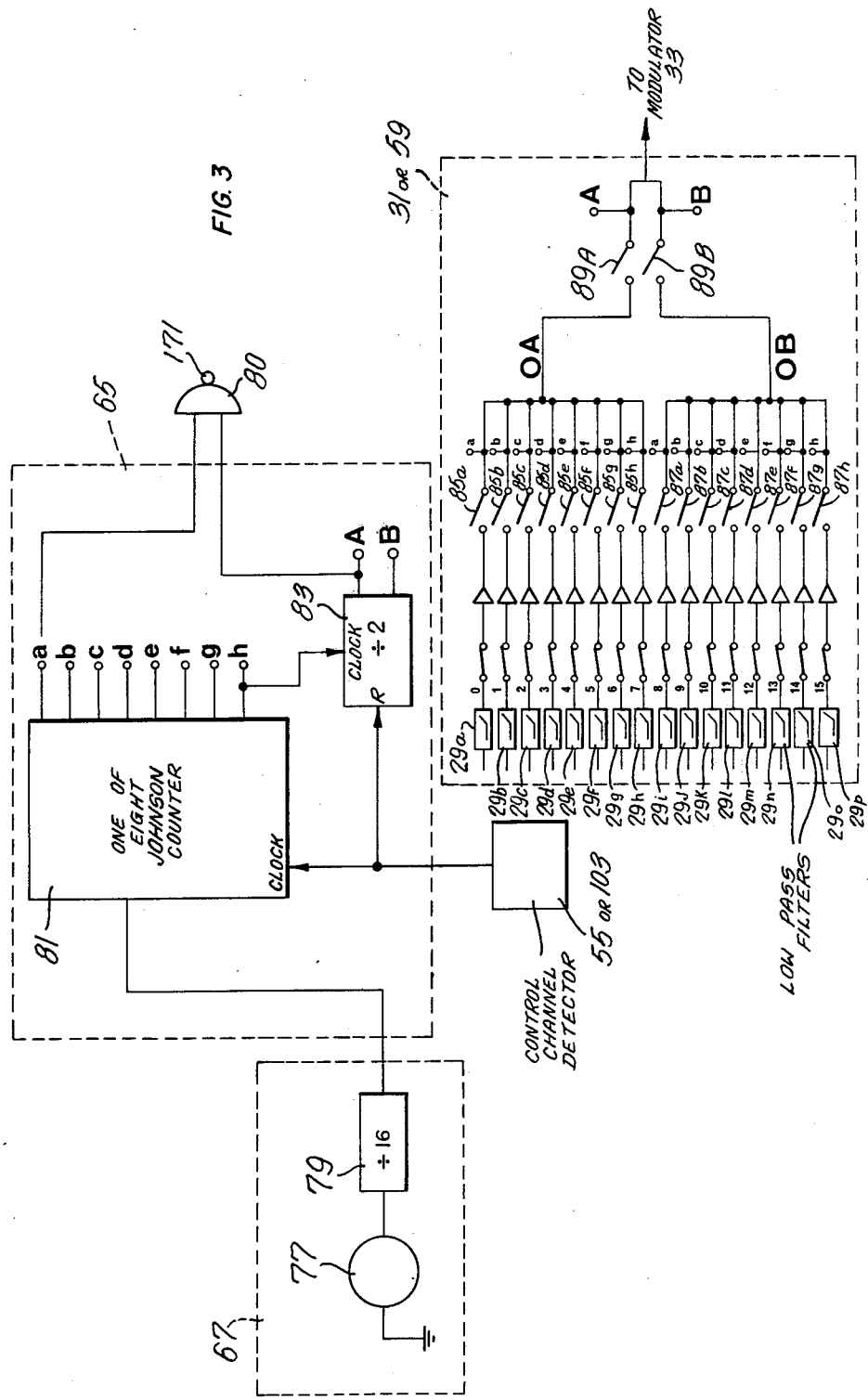
FIG. 3 shows one form of a switching arrangement which can be used in the multiplexer switching unit, as well as timing circuitry associated therewith.

A circuit diagram of one form of the multiplex switch unit along with the associated part of the timing circuitry and the clock means is shown in FIG. 3. The FIG. 3 circuit is of the type used with a 16 channel system with a cycle of 125 usec and a sample length of 7.8 usec, as in the preferred embodiment.

Referring to FIG. 3, the switch units are contained within the dashed line box labelled 31 or 59, the timing circuitry is contained within the dashed line box labelled 65, and the clock circuitry is contained within the dashed line box labelled 67.

The clock consists of an oscillator 77 whose output frequency is 2.048 MHz, and a divide by 16 frequency divider 79 which provides a pulse output after counting the 16 leading edges of input pulses. Thus, the output of 67 is a pulse wave with a frequency of 128 kHz, i.e. one pulse every 7.8 usec.

The timing circuitry comprises a one of eight Johnson counter 81 having eight output leads "a" to "h" and one input lead. In operation, a high appears at only one of the output leads at any one time. When a pulse is applied to the input, the high moves to the next lead down. When the high is on lead "h" and a pulse is applied to the input, the high will move to the "a" lead and start a new cycle. The timing circuitry also includes a flip-flop 83 having a clock input terminal and a reset input terminal, as well as A and B output terminals.

As is well known in the art, a high will be present on only one of the A or B terminal at any one time.

The multiplex switch unit consists of a first plurality of eight lines 0 to 7, each interrupted by switch means 85a to 85h respectively, and a second plurality of eight lines, 8 to 15, each interrupted by switch means 87a to 87h respectively. As can be seen each line is connected, at one end thereof, to a separate connecting port. In addition, each of lines 0 to 7 contain terminals a to h respectively, and each of lines 8 to 15 contain terminals a to h respectively. Each of these terminals are schematic representations of control means for their respective switches, and each control means a to h is connected to outputs a to h of the counter 81 respectively. The control means operate in such a way that, when the output to which they are connected is high, the switch they control will be closed.

The lines 0 to 7 are connected together at the output ends thereof, and the junction of these lines is connected to a further line 0A, which is interrupted by switch 89A. In a like manner, the lines 8 to 15 are connected together at their output ends, and the junction thereof is connected to line 0B which is interrupted by switch 89B. The output ends of lines 0A and 0B are connected together and the junction thereof is connected to the modulator 33 of FIG. 2. Lines 0A and 0B contain terminals A and B respectively which comprises the control means for switches 89A and 89B respectively and which are connected to output A and B of flip-flop 83 respectively. Each switch is closed when a high is applied to its control means.

In operation, the above described circuits operate as follows: Assuming a high is present at output g of counter 81, and that a high is present at output A of the flip-flop, it can be seen that switches 85g, 87g and 89A will be closed. Thus, the output of connecting port 6 will be applied, through closed switches 85g and 89A to the input of the modulator. None of the other connecting port outputs will be applied to the modulator as switches 85a to 85f and 85h are open so that the inputs of lines 1 to 5 and 7 cannot reach line 0A. Similarly, as line 0B contains open switch 89B, the output that reaches it on line 14 through closed switch 87g will not be applied to the modulator. Thus, the data on only one connecting port reaches the modulator.

After 7.8 μsec, a pulse is applied to the counter 81 so that the high moves to output h. At this time, only the output of connecting port 7 will reach the modulator. After a further 7.8 μsec, a further pulse will be applied to 81 so that a high will appear at output a thereof. In addition, the lagging edge of the pulse at output h will set the flip-flop so that a high appears at output B thereof. Thus, switches 85a, 87a and 89B are closed. At this time, only output of connecting port 8 will reach the modulator over line 0B.

With the above circuitry, each connecting port is sampled for a period of 7.8 usec once every 125 usec. In addition, the output of the multiplexer is a continuous stream of the sampled outputs.

It is, of course, understood that the above-described circuitry comprises only one circuit for carrying out the timing and multiplexing functions and that other circuits can also be used for these purposes within the spirit and scope of the invention.

FIG. 3 also illustrates how the control channel detector can be connected to the timing circuitry and the operation of this detector will be described below.

Figure 4:
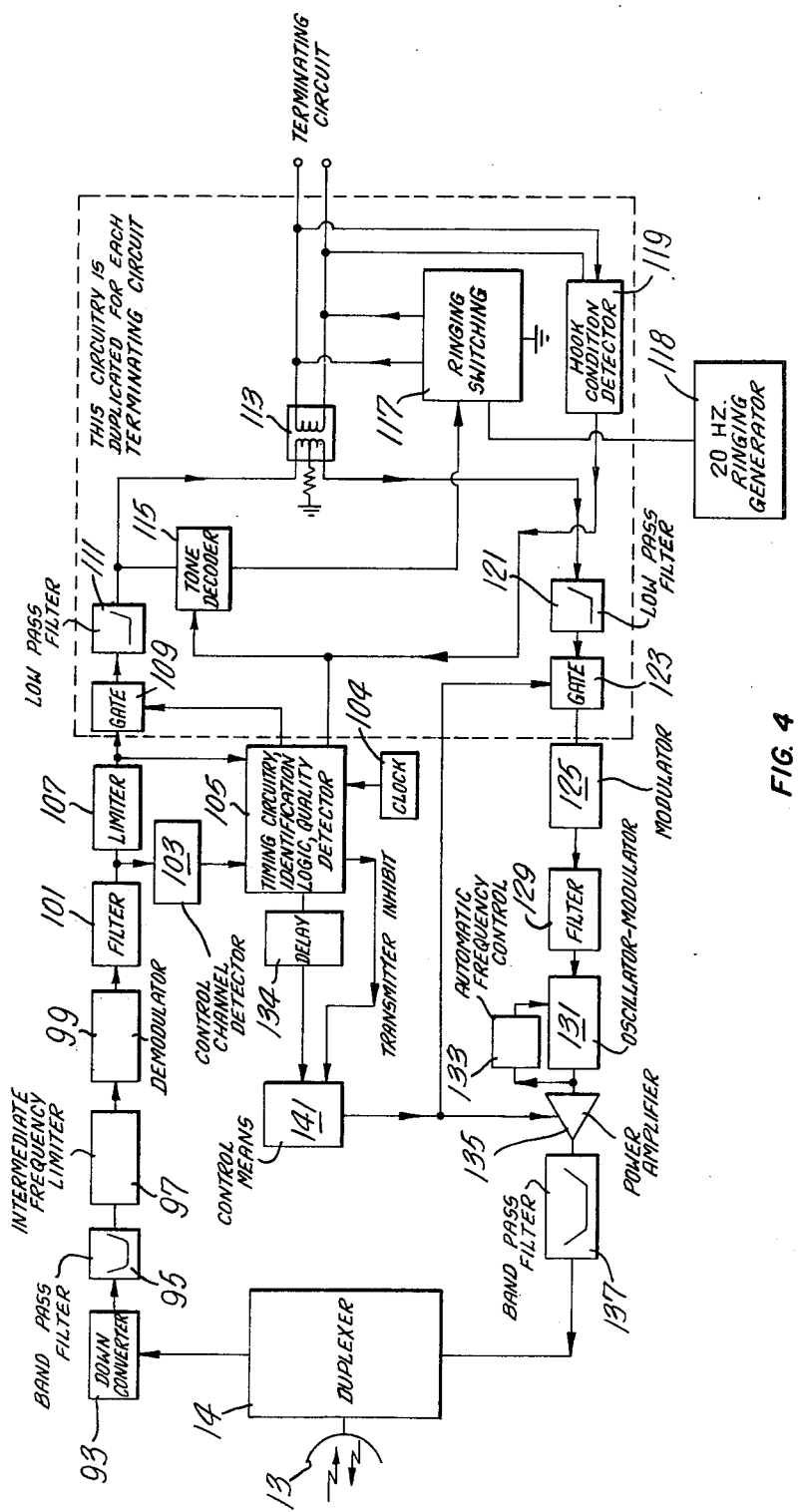
FIG. 4 illustrates, in block diagram form, a preferred embodiment of an outlying station; in a specific embodiment wherein the outlying station provides service to a telephone subscriber.

An outlying station, which will operate in conjunction with a central station as above-described, is shown in FIG. 4. The outlying station illustrates a telephone subscriber application but is not limited to this application. The control station consists of two main parts; The radio and control section on the left hand side of FIG. 4 and the line terminator circuitry as required enclosed in the dashed line box at the right hand side of the figure. The line terminator circuitry illustrated is specific to a telephone subscriber loop. Other appropriate line terminator circuitry would be provided for other types of information circuits.

Each outlying station can service more than one terminating circuit. The radio and control part is common to all terminating circuits, but a separate line terminator is provided for each terminating circuit. As each line terminator may contain the same structure as every other line terminator, only one is shown and described in FIG. 4.

The output of the duplexer 14 is fed, via down converter 93, BPF 95, IF limiter 97, demodulator 99, filter 101 and limiter 107, to the gate 109 of the line terminator. At the same time, the output of the filter 101 is fed to a control channel detector 103 whose output is fed to the circuitry box 105 which contains timing circuitry, logic circuitry, and quality control circuitry. The clock is preferably a VCO under control of circuitry in 105. Circuitry 105 will also examine the quality of the received signal and, if it falls outside predetermined limits, circuit 105 will inhibit the transmitter.

In the telephone line terminator shown, the tone decoder 115, fed from LPF 111, detects a ringing signal when it is present and actuates the ringing generator 118, through ringing switching 117, which sends a 20 Hz ringing signal down the subscriber loop line, when such a ringing signal is present. A tone, rather than a DC is used as a DC signal cannot be sent over the radio link.

The 4 wire signal is converted to a 2 wire signal in the hybrid 113 for voice communications with the subscriber loop.

In the transmit direction, the hook condition detector 119, which can merely be a DC detector as well known in the art, determines whether the subscriber loop is in the ON or OFF hook condition. If the loop is OFF hook, then the detector will provide a signal which will inhibit the tone detector so that it cannot actuate the ringing generator. At the same time, it will provide a signal to the circuit 105 which will then generate an appropriate code for transmission to the base station.

The voice signal is again converted from a 2 wire to a 4 wire signal in the hybrid 113, and the 4 wire signal is then fed, through LPF 121, Gate 123, modulator 125, filter 129, RF oscillator-modulator 131, power amplifier 135, and LPF 1337, to the duplexer 14 and to the antenna 13 for transmission. AFC 133 can comprise any appropriate circuit well known in the art for providing the automatic frequency control function.

Control means 141 performs the function of insuring that the transmitter is inhibited at all times other than its appropriate transmission time slot as will be discussed below. Means 141 can be a shaped pulse generator whose output will key the power amplifier and open the gate 123. As can be seen, 141 is actuated byy the timing circuit 105.

Delay 134 compensates for the differences in distance between the different outlying stations and the central station. As will be seen, it is essential that the signal from an outlying station arrive at the central station in its proper time slot. By providing different delays in the different outlying stations, the relative timing as between the outlying stations, vis-a-vis the time of arrival of an outlying station signal at the central station, is controlled.

It is contemplated that each outlying station will be able to service up to six terminating circuits.

Figure 5:
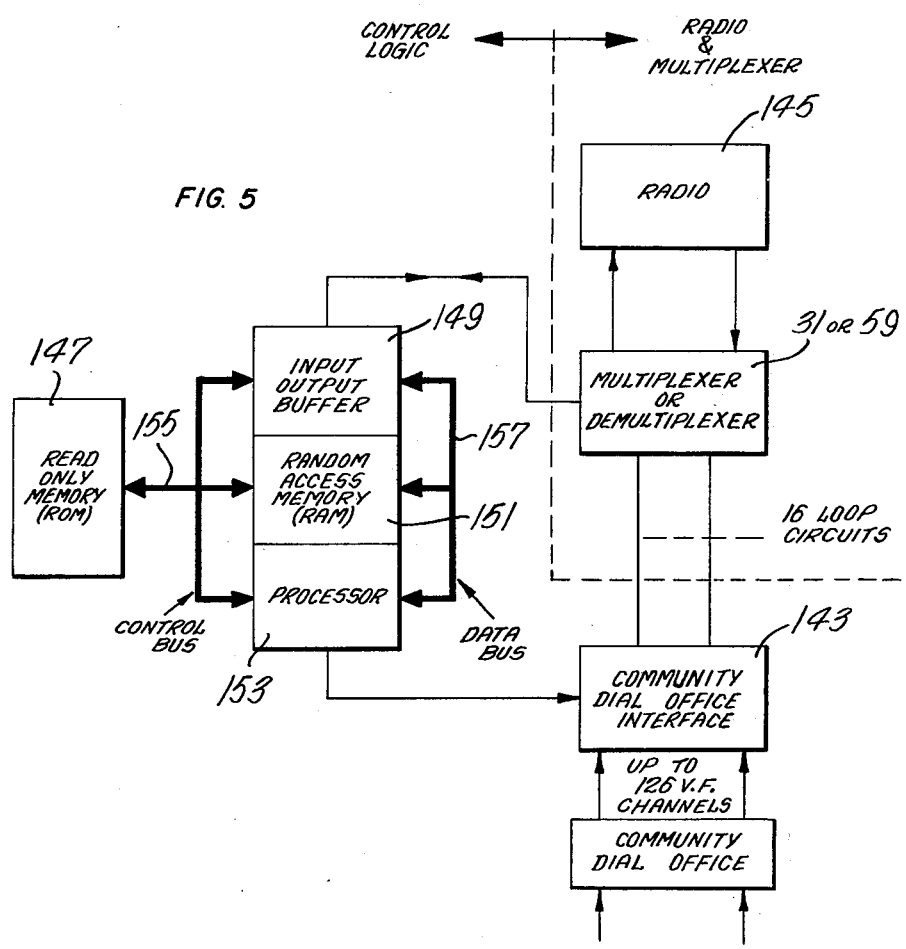
FIG. 5 illustrates the interconnections of the Traffic Control logic unit in a specific embodiment related to providing telephone service from a central switching office.

A simplified block diagram of the traffic control logic is shown in FIG. 5. As can be seen, the unit consists of five basic building blocks;

A read only memory 147
An input/output buffer 149
A random access memory 151
A processor 153
A CDO interface 143 which may be any other information center.

The read only memory is preferably a non-volatile memory unit which will contain the sequence of operations of the rest of the TCL. The input/output buffer allows the TCL to accept data arriving on the incoming stream and to inject data on the outgoing stream. The random access memory is used as a temporary store to store such information as the addresses of outlying stations presently handling traffic, and which channel number they have been assigned.

The processor generates signals to operate the switches in the CDO interface unit at the right time and in the right sequence. The CDO interface contains a matrix array of bi-lateral switches under the control of the TCL which provide interconnections between the VF channels of the CDO and the subscriber loops for a telephone application.

Control bus 155 carries the control signals from the ROM to the I/O buffer, the RAM and the processor. Data between the building blocks is moved over the data bus 157. The functions of the TCL will be described below. As will be seen, the design of the circuits for implementing these functions is within the normal skills of one skilled in the art, and such design does not constitute a part of the invention. However, to better teach the invention, Appendix "A" hereof provides a more detailed description of the TCL.

Appendix "B" includes an instruction set for the processor, while Appendix "C" and "D" illustrates a preferred flow chart of a program for controlling the processor and an instruction listing of the program respectively.

In considering the operation of the inventive system, there are two separate embodiments whhich must be examined:

a. The dedicated channel system wherein the number of outlying terminating circuits is less than or equal to the number of system channels;

b. The random access system wherein the number of outlying terminating circuits is greater than the number of system channels.

In the dedicated channel system, there is no requirement for the TCL, as outlying stations do not have to be polled, and a decision does not have to be made as to which channel should be assigned to which terminating circuit. In addition, as the number of terminating circuits is less than or equal to the number of time channels, the number of VF channels from the CDO is also less than or equal to the number of time channels. Thus, the VF channels from the CDO can be connected directly to the terminating circuits so that a CDO interface is not required.

In the dedicated channel system, each connecting port and terminating circuit is assigned a specific time channel or time slot. It is only necessary that the clock and counters of the outlying station remain in sync with the clock and counters at the master station, and to this end, 104 is a VCO under the control of circuitry in 105.

In the central station, the input channels are sampled at a predetermined rate, say in 125 μsec cycles, with the width of each sample being substantially identical to the width of every other sample, e.g., with 16 time channels, sample width is 7.8 μsec. The samples are then combined into a single stream with one sample following the other. This is, of course accomplished in the multiplex switch 31 as described above. The stream then modulates an RF carrier, and the modulated RF Carrier energizes the antenna 12 for transmission of the modulater carrier. The transmitted signals will then be received by all antennas 13 of all outlying stations. However, timing circuitry 105 will open gate 109 only in the time slot with which the terminating circuit is associated. Thus, only the samples of the time slot associated with this terminating circuit will be supplied to the circuit terminating or telephone equipment. The LPF 111 as is well known in the art, will connect the individual samples at each terminating circuit gate into a continuous analogue signal which is converted, in hybrid 113, from a 4 wire to a two wire signal which is then transmitted to the circuit terminating or telephone equipment. In a telephone application, ringing tones will be detected by the tone decoder to actuate the ringing generator when a ringing signal is transmitted from the base station.

Through control channel detector 103 there will be a connection between the output of filter 101 and timing circuit 105 to insure synchronization of counters in 105 with the counters at the central station. It is noted that in order for the timing circuit of the receiver portion of the outlying station to be in system sync, it will most likely be out of sync in real time with the timing circuit of the central station as the signal transmitted by the central station in the time slot of the terminating circuit will arrive at the outlying station some time after it has been transmitted. Thus, to be in system sync, the timing circuit of the receiver section of the outlying station will have to lag the timing circuit at the central station.

Synchronization of the timing circuitry at the outlying station with the timing circuitry at the central station is accomplished as follows: at the central station, an exalted pulse is periodically sent out in a predetermined time slot. Preferably, the predetermined time slot is the zero time slot. The exalted pulse could then be sent out, say, every cycle, or every 5th cycle, etc. At the outlying stations this exalted pulse will reach the timing circuitry 105 via the Control Channel Detector 103 (FIG. 4) and can be used to reset the clock (as will be explained below with reference to FIG. 6) if the outlying station is out of sync.

The connection 103 between the output of 101 and the input of 105 will also feed a signal to the quality detector part of 105 and, if the quality of the received signal falls outside predetermined limits, the transmitter of the outlying station will be inhibited.

In the described telephone application, on the transmitter side, the telephone will be either ON or OFF hook. If it is OFF hook, the subscriber will usually be either talking or dialling a number.

As mentioned above, the transmitter is keyed only in the time slot allocated to the terminating circuit in question. The distance between the stations must be taken into account. As the signal from the central station is sent some time before this time slot is received at the central station, in order to be in system sync, the timing circuit of the transmitter portion of the outlying station will have to lead the timing circuit of the central station. The amount of time that a transmitter is keyed to be on, will be equal to the sample width at the central station, and the period of cycling at the outlying station transmitter will be equal to the period at the base station.

Voice signals will also be keyed so that what is transmitted is in effect, samples of the voice signal. When an outlying station is servicing more then one terminating circuit, the transmitter will be keyed in the time slot of all the terminating circuits active in this period. However, circuit gate 123 will be keyed only during the time slot of its respective terminating circuit. These samples arrive from the different outlying stations to the central station in their respective time slots so the signal fed to the receiver at the central station comprises a stream of samples ordered in the sequence of the time slots. The stream is then split up into the respective connecting ports in the demultiplexer 59 so that each connecting port at the end of the central station receiver contains only data from its assigned terminating circuit. The content at each port will again be a series of samples which will be processed, in manners well known, to form an intelligible audio signal or data stream.

With the dedicated channel system, a time slot is always available to each terminating circuit and the time channel is predetermined. Thus, when the central station has to communicate with an outlying station, the central station knows exactly where to go.

In the random access system, the time channels or time slots are not so assigned. In order for the central station to maintain control over the outlying stations, the central station polls the outlying stations one at a time to determine their status and to acknowledge any of their requests. The polling of the outlying stations comes under the control of the TCL.

The polling activity requires that each terminating circuit be separately and uniquely identifiable. Accordingly, each terminating circuit is assigned a unique code. The code can be an eight bit binary code which provides 256 different identifiers. More or less bits could be used depending on the requirement, or codes other than binary codes could be used for identification purposes. In any case, the code is generated at the central station under the control of the TCL.

To poll an outlying station, the central station first sends out the identifying code of the station. It will, of course, be appreciated that, if the code is an eight bit code, it will require eight sampling cycles just to transmit the code. However, as a cycle is only 125 μsec, the amount of time required for transmitting the full code is only 1.0 msec.

The code is transmitted on a control time slot or channel. This is any arbitrary, unused channel selected by the TCL. Data transmitted on this channel is continuously monitored by all outlying stations regardless of their circuit demand conditions. The TCL, when it selects a control channel, will transmit a control channel identifier code on that channel to alert all outlying stations. The code can be simply an exalted pulse. The identifying code of a polled station is then transmitted, and each outlying station will examine the code in the identification logic 105 of the outlying stations. Only the terminating circuit identified by the code will react as described below. The remainder of the terminating circuits will await the reception of the respective codes.

It will, of course, be appreciated that when an outlying station services more than one terminating circuit the identifying codes of each terminating circuit will be stored in 105, and 105 will contain separate control outputs for respective gates 109 of the terminating circuits under its control.

After the outlying station successfully decodes its code, the transmitter of the terminating circuit will be opened long enough to permit the terminating circuit demand status to be transmitted. Then the transmitter is again inhibited. While awaiting a response from the outlying station, the TCL examines the connecting port from the CDO to see if a circuit demand is present. If this demand is not present, and the terminating circuit reports no circuit demand condition, then the central station will poll the next outlying station terminating circuit. In this regard, the identifying codes of the terminating circuits are contained in the ROM in sequence and the stations will be polled in this sequence.

If there is a circuit demand, such as a ringing signal present from the CDO, or if the terminating circuit reports a circuit demand such as an off hook condition, this indicates that a connection is required. The TCL will now poll the terminating circuit a second time and, when the second successful decoding is accomplished, the logic circuitry of the outlying station will cause the terminating circuit to lock onto the control channel so that this terminating circuit will receive transmissions in this time slot. Of course, the transmitter port of the terminating circuit will also be synchronized onto this channel, so that the terminating circuit will transmit in this time slot. The control channel is now carrying traffic, so that it cannot be used for control purposes any longer.

The TCL will accordingly select another channel which is not handling traffic as the new control channel. Again, a control channel identifier is transmitted and all outlying stations will monitor the new control channel.

While the polling is taking place, the committed time slots will be carrying traffic to their respective terminating circuits.

Besides the functions already described, the TCL will monitor all assigned channels for the reception of RF carrier in the time slot.

When this carrier disappears for whatever reason, the TCL will cease its normal polling sequence, and will poll the outlying terminating circuit which had been assigned the time slot, using the control channel.

If this is successfully decoded by the outlying station, its transmitter will be enabled long enough to reply with circuit demand status, then shut down.

Under normal conditions the carrier will have disappeared because the communications had terminated and the circuit demand had disappeared. In this event no circuit demand will be received to the poll, and the channel will be available for reassignment.

However, abnormal or malfunction conditions could have caused the carrier to disappear. Some of these conditions and corrective actions follow:

i. A deep prolonged fade in direction central to outlying station or failure of outlying station receiver.
    This would be sensed by the quality detector and cause the outlying station TX to shut down as above-described. While the condition perists there will be no response to a poll. This will cause an alarm condition to be logged at the base station.
 ii. A deep prolonged fade in the direction outlying station to central or failure of outlying station transmitter.
    This would result in failure to respond to a poll, and give rise to an alarm at the central station.
 iii. Loss of synchronization at the outlying station.
    If this were due to fading or Rx failure this would be covered by case (i).
    However, if some other cause resulted in jumping synchronization, polling the outlying station would bring him back into synchronization and force him on to the control channel.
    This response to the poll would be a circuit demand condition, in which case he would be re-polled as described above and the circuit re-established.

As was mentioned above, any type of modulation can be used. However, PWM is preferred primarily due to the fact that this type of modulation has greater echo immunity.

Another benefit derived from using PWM is that it readily provides a means of maintaining system synchronization. Periodically a time slot, in addition to being width modulated, is also simultaneously amplitude modulated. This is the above referred to Exalted Pulse.

Figure 6:
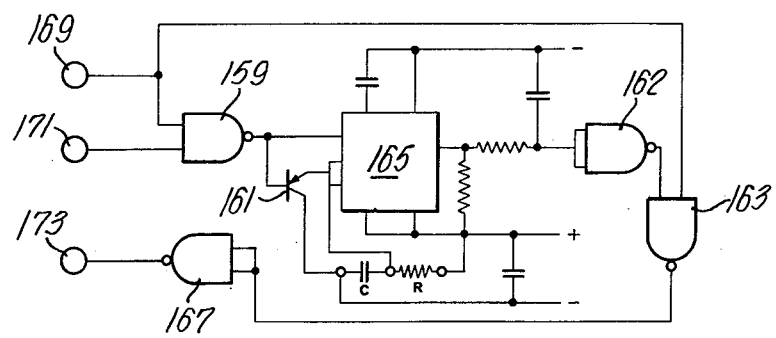
FIG. 6 is a circuit diagram of a specialized circuit used in the system.

The mechanics of maintaining synchronization are as follows:

When the central station counters are at zero, the Exalted Pulse Generator circuit (37 in FIG. 2) is activated and the positive portion of the information pulse within the 7.8 uS time slot is increased in amplitude. At the outlying station, an Exalted Pulse detector (103 in FIG. 4) senses the presence of this pulse by slicing off the bit stream at a predetermined level, and this pulse is used to force the counters of the outlying station timing circuit to zero. Special circuitry is used to differentiate between a genuine exalted pulse and a noise impulse, so that noise bursts do not erroneously set the system. One circuit is shown in FIG. 6.

In FIG. 6, 159, 162, 163 and 167 are two terminals NAND gates. NAND gates 162 and 167 are connected as inverters. 165 is a monolithic timing circuit and R and C are a resistor and capacitor respectively having a time constant somewhat longer than the time between Exalted pulses. Terminal 169 is connected to the output of control channel detector 103, and terminal 171 is connected to the circuitry of 105 and would go true when the counters are at zero. This would be the output of AND gate 80 of FIG. 3 when such a timing circuit is used. Terminal 173 is connected to the RESET terminals of the counters in the timing circuitry of 105 (FIG. 4).

In operation, the circuit works as follows: Capacitor C is charged through resistor R and the time constant of RC is so chosen that, if C is charged for a period of time less than or equal to the time between exalted pulses, it will not charge up to a high enough value to trigger timer 165. When the outlying station is in sync, then pulses will arrive at terminals 169 and 171 at the same time. Gate 163 is normally closed so that output from 169 arriving at this gate will not be permitted to pass. However, when the pulses arrive at both inputs of gate 159, it will provide an output which will turn transistor 161 on. The capacitor C will discharge through the turned on transistor and, after gate 159 closes to turn off transistor 161, the charging cycle will begin again. As can be seen, under these conditions, no signal is provided at terminal 173 so that the timing circuitry remains unaltered.

If, however, the outlying station is not in sync, then the exalted pulse will not arrive at terminal 169 when the frame pulse arrives at 171. Thus, no signal will be provided to transistor 161 to turn it on so that there be no discharge path for capacitor C. Thus, the capacitor will charge up to a large enough value to trigger the timer 165. This will open gate 163 via inverter 162, to allow passage of the next exalted pulse which arrives. Thus, the next exalted pulse will pass through gates 163 and 167 to reset the counters of timing circuit 105 to the control channel. The outlying station is now in sync so that the next exalted pulse which arrives will correspond, time-wise, with the frame pulse. The output of gate 159 at that time will discharge capacitor C by turning transistor 161 on. At the same time, it will reset timer 165 which through inverter 162 will close gate 163.

In the above, only radio waves have been considered as the coupling means between the central connecting ports and the terminating circuits. As has been mentioned above, it is also possible to use conductor cables as the coupling means. In some cases, it may be feasible to use a cable pair for these transmission purposes. In such cases, different carriers could be used for transmitting from the central station and for receiving by the central station. This is so that only one pair of cables would be needed for transmission in both directions. Usually, the carrier frequencies are chosen different from the frequencies used in the case of radio wave coupling, but in all other respects, the systems are similar.

However, the invention is particularly useful when cables are already available between a central station location and a plurality of outlying locations. These cables may be carrying TV and radio signals, as well as other communications data. In this situation, it is contemplated that the various different signals may be frequency division multiplexed, i.e. each different signal would be carried by a different carrier frequency and the several carriers would be carried by the same cables. One or more of such different carriers may be modulated by the inventive system. Techniques and equipment for frequency division multiplexing and demultiplexing are well known in the art and do not constitute a part of this invention, and the remainder of the system would be similar to the system wherein the coupling means are radio waves.

Although the system has been described for use with a telephone network, the same system can be used to distribute other types of information and data. As will be apparent, when other data is distributed, the inputs and outputs will be different. Thus, considering FIG. 2, all of the equipment to the left of the multiplexer-demultiplexer line would be changed. But, the equipment to the right of the line does not change in principle when different information or data is distributed.

In a like manner, the equipment in the dashed line box in FIG. 4 would change with a change in data. But, the equipment outside of the dashed line box is not changed.

The invention has above been described in general terms and should provide one skilled in the art with enough instructions for practising the invention. Nevertheless, exemplary embodiments of certain portions of the inventive system are described below to better instruct one skilled in the art in the practice of this invention.

Figure 7:
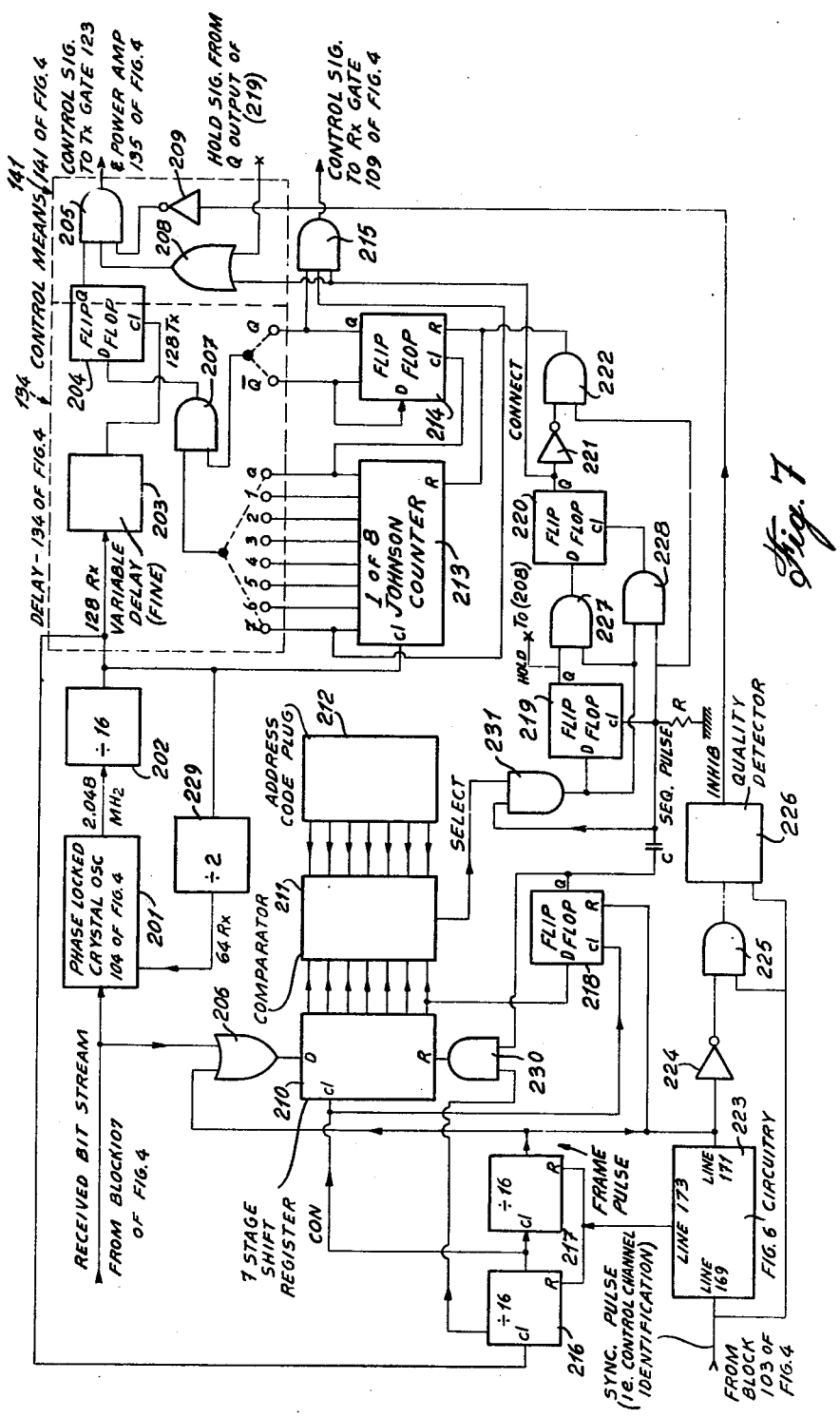
FIG. 7 illustrates specific exemplary circuitry of blocks 104, 105, 134 and 141 of FIG. 4.

Turning first to FIG. 7 of the drawings, illustrated in FIG. 7 are specific and exemplary circuits for accomplishing the requirements of the blocks identified as 105, 134 and 141 of FIG. 4.

Considering first the timing organization of the system, in the preferred embodiment discussed above, there are 16 time slots each approximately 7.8 $\mu$ sec wide used to communicate between the central and subscriber stations. The grouping is such that 16 consecutive time slots, one of which is the control slot or channel, constitutes a subframe of 125 $\mu$ sec duration. Eight subframes make a half frame of 1 msec and, of course, 2 half frames give a frame of 2 msec.

The very first pulse at the start of each full frame sent by the central station is marked and recognized by all subscriber units at the outlying stations to indicate to them that (a) this is the control channel, and (b) it is the start of a polling sequence.

In this system, one channel (time slot) is always used for control purposes and handles digital information only. The remaining 15 channels handle the message path information and are assigned as required on a fully random access basis between all subscribers forming part of the system. As will be clear, this is a system wherein the number of subscribers is greater than the number of time slots or channels available so that the TCL is in operation.

All subscribers who have not been assigned a channel are interrogated or polled sequentially by the central station sending out the subscriber 7 bit binary address.

Thus, the first pulse of the whole frame is a sync pulse on the control channel. The address of the subscriber station under interogation is transmitted in the control channel time slots of the next 7 sub-frames at the rate of one bit per sub-frame. Hence, by the end of the first half frame, the interogation of one subscriber is complete. During the second half frame the central station awaits for the subscriber to decode the transmitted address and to make the reply of his hook status, which is sent back over the control channel.

Referring now to FIG. 7, the bit stream, in its entirety, and identical at all subscriber stations, splits in two ways. In one path, it goes to the OR gate 206 and from this path the address information will be extracted as described below.

In the second route, the bit stream is fed to a phase locked crystal oscillator 201, running at a nominal frequency of 2.048 MHz. The phase lock oscillator is of the type which is well known in the art and needs no further description here. The 2.048 MHz. signal emerging from the locked loop is at precisely the same frequency and has a fixed phase relationship to its counterpart master oscillator at the central station.

The 2.048 MHz signal is divided by 16 in divider 202 to give a 128 KHz signal (hereinafter referred to as 128 Rx) which is the clock signal used to advance the received counters. The 128 Rx is divided by 2 in divider 229 to give a 64 KHz reference signal which is compared with the received bit stream in the phase lock loop.

The 128 Rx signal also clocks a divide by 16 counter 216 which gives an output every sub frame. Since this last divider is reset to zero by the sync pulse via FIG. 6 circuitry as described above, it follows that the pulse at the output of this divider (which is marked CON in FIG. 7), identifies that the information on the receive bit stream at this time is control channel information. By using the CON signal to clock a 7 stage shift register 210, the digital address information is fed into the register during the first half frame.

The CON signal is also used to clock another divide by 16 counter 217 which counts the 16 sub frames to give an output pulse at the start of each complete frame. This output is marked FRAME PULSE in FIG. 7.

The 128 Rx clocks a 1 of 8 Johnson counter 213 and the last stage of the Johnson counter clocks a flip flop 214. The number 7 output of 213 and the "Q" output of 214 are two of the three inputs to AND gate 215. The output of gate 215 controls the receive gate switch (item 109 of FIG. 4).

However, unless the station has been assigned a message channel, the third input to gate 215, marked CONNECT, will be low and the gate will remain blocked.

It is also noted that the reset pins of counters 213 and 214 are connected together and the reset is activated indirectly from the sync pulse, as will be later described. It has already been shown that the counters, dividers, and flip flops consisting of the parts labelled 229, 216, 217, 213 and 214 are all clocked either directly or indirectly from a common signal called 128 Rx which has a frequency and phase relationship firmly tied to the mast oscillator clock at the central station. Also, each of the above devices using a reset pin are reset to zero at a time derived directly or indirectly from the sync pulse which is generated and sent from the central station when the central station clocks are at zero.

As above discussed, in the basic system design, information from a subscriber is expected to be received at the central station in the same time slot as information sent to the subscriber from the central station, whether this be data information via the control channel or message information over an assigned message channel. Irrespective of the media used to transport the information, it takes a finite time to traverse the distance between the central and subscriber stations in each direction.

In the direction central to subscriber, timing synchronization is relatively simple since the sync pulse used to maintain sync is transported to the subscriber over the same medium as the bit stream and thus suffers the same delay as the message or data information. However, in the direction subscriber to central station, the transmitted information must be delayed by a finite period of time with respect to the received time slot to ensure that the subscriber information arrives at the central station in the correct time slot but an integral number of sub frames later.

The required delay time is a direct function of the path length and is set by the circuitry of block 134 of FIG. 4 which is shown in more detail in the dotted line labelled 134 in FIG. 7. As can be seen, this includes a variable delay (fine) means 203, a flip flop 204, and AND gate 207.

To understand how the means 134 operates, it must be recalled that the counters 213 and 214 control the timing of the received signals. A signal delayed with respect to the received time slot is derived by ANDING one of the 8 outputs of the Johnson counter 213 with either the Q or Q signal from the flip flop 214, in the AND gate 207. By the nature of the circuit, this delay can only be incremented in 7.8 microsecond steps, and these strapping options are referred to as the COARSE TIMING ADJUSTMENTS.

To obtain the precise delay required, the output of AND gate 207 is applied to the DATA input of the flip flop 204 at a point shortly ahead of the time that the transmitter is required to operate, and is clocked out of the flip flop at the exact time required.

The clock pulse for the flip flop 204 is derived from the circuit of 203, and means for providing such a variable delay circuit are well known in the art. As an example, this circuit may comprise a circuit which takes the 128 Rx square wave signal and integrates it to generate a ramp. The ramp signal is then applied as one input to a comparator amplifier. The second input to the comparator is a variable DC bias voltage set by a potentiometer to determine the point in time where the comparator will switch. The output of this comparator is then fed to flip flop 204 to generate a pulse at its Q output at the time the transmitter would be required to be activated, and this signal is one of the three inputs to AND gate 205 which will be discussed further below.

It is also fundamental to the system that each subscriber station recognize the fact that it has been interogated or polled, and that it react to this fact. This is achieved by the circuitry consisting of OR gate 206, shift register 210, comparator 211, address code plug 212 and flip flop 218. Each subscriber is allocated a unique 7 bit binary address which is set by the code plug 212. The code plug is a passive device which simply places a logic HI or LO on each of the seven output leads which it feeds to the comparator 211.

The binary address is picked out of the bit stream by clocking it into the seven bit shift register 210 via the OR gate 206 using the CON signal which was discussed above. Since the bit stream is in neither the logic HI or LO state at the start of the frame, an artificial HI is injected in the register by applying the locally generated FRAME PULSE through OR gate 206.

Address information is clocked into the register 207 sequentially until the frame pulse arrives at the last output of the register followed by the six most significant bits of the address. As can be seen, the last lead of the register, which now is logic HI since it holds the frame pulse, is connected to the DATA input of the flip flop 218. The next CON pulse sets the full 7 bit address in the register and causes the Q output of the flip flop 218 to go to logic HI, which primes AND gate 230, and is differentiated by C and R to give a SEQ. PULSE. The comparator looks at the 7 leads fed to it from the shift register and the 7 leads from the code plug and checks them for comparison. If it finds that comparison exists, its output goes to a logic HI giving rise to a SELECT pulse which feeds AND gate 231, together with the SEQ PULSE. The action from this point onward will be taken up below.

Meanwhile, we have reached a point where the address has been read out and correctly decoded, which, has given rise to SELECT PULSE signals and primed AND gate 230. The very next clock pulse causes the first stage of divider 216 to go HI which causes the output of AND gate 230 to go HI and clear the register 210.

At an idle station which is on hook and is not being polled, the Q outputs of flip flops 219 and 220 will be at logic LO. Thus, the output of inverter 221 will be HI so that AND gate 222 is primed to allow passage of SEQ PULSES that will reset counters 213 and 214. This ensures the receive time slot is correctly positioned on the control channel.

A single poll of a particular subscriber gives simultaneous SELECT and SEQ PULSE signals which are applied to AND gate 231 and this applies a logic HI to the DATA input of flip flop 219. Since the SEQ PULSE is also used to clock this flip flop, the Q output, labelled HOLD in FIG. 7, of 219 goes HI, and this is applied to OR gate 208 to enable the station to reply with its hook condition report.

If the central station now polls a second and different subscriber, when the poll is finished the first subscriber would generate a SEQ PULSE, but the SELECT line would remain LO. Thus, the DATA input to 219 would also be LO and that would be clocked to the Q output by the applied SEQ PULSE restoring the flip flop to its original state.

If, however, a particular subscriber were polled twice in succession, then the first poll would cause HOLD to go HI (Q output of 219) as already described. This will, of course, prime AND gate 227. A second poll will again provide SELECT and SEQ PULSE signals, which after ANDING in gate 231 passes via AND gate 227 to put the data input of 220 HI, and this is clocked to the Q output of 220. The Q output of 220, marked CONNECT, enables both the transmit and receive gating signals via gates 208 and 215 respectively. Inverter 221 inverts the CONNECT signal which disables AND gate 22 and blocks passage of subsequent SEQ PULSES from resetting counters 213 and 214.

Thus, these counters will continue to run and provide gating pulses on the time slots in which they were polled. This is the manner in which a subscriber is assigned a channel, and note that it was the former control channel that has been assigned.

The central station now selects a new free time slot to become the control channel and moves the sync pulse onto this new channel. All subscriber stations in the system detect that the control channel has changed, using the circuitry of FIG. 6, since the FRAME PULSE and the receive sync pulse are no longer coincident in time. The dividers 216 and 217 are reset by the circuitry of FIG. 6, and all subscriber stations including the one just selected continue to monitor the polling signal being received now on the new control channel.

Once a subscriber station has been allocated a time slot for message transmission, it is not polled again until the central station detects that RF carrier has disappeared from the allocated time slot. Thus, the next poll sent after the two which caused the selected station to be connected would be the address of a different subscriber. This would be detected at the selected subscriber station also, and yield a SEQ PULSE without a SELECT pulse causing the HOLD to revert to a LO logic state as described earlier.

Any subsequent polling of the selected subscriber station will cause flip flop 220 to toggle, its Q output will go LO, disabling the recieve and transmit gating signals, opening gate 222 which will cause the SEQ PULSE to reset counters 213 and 214 onto the current control channel.

The quality detector portion of the circuitry consists of the item 223, i.e., the FIG. 6 circuitry, inverter 224, AND gate 225 and quality detector means 226. If a subscriber station is in lock with the central station timing, the locally generated frame pulse will occur at the same time as the received sync pulse. Then the output of the inverter 224 will go to a logic LO state preventing the passage of the sync pulse through the AND gate 225. Thus, while the station is on lock, the output of AND gate 225 which is one of the two inputs to the quality detector means 226 remains permanently at a logic LO condition.

If lock is lost for any reason, sync pulses will pass through AND gate 225 and be detected by the quality detector circuitry which will cause the INHIB line to go to a logic HI level. The INHIB signal is inverted in inverter 209 and the transmit pulses are prevented from passing through AND gate 205. Thus, as long as the station is out of lock, its transmitter remains disabled. The sync pulses are also applied directly as the second input to the quality detector means 226. In the event that for any reason the station fails to detect any sync pulses, the quality detector circuit will again cause the INHIB line to go HI and disable the transmitter.

The circuitry of the quality detector needs only provide a logic HI output on an input to any one of two terminals. Such circuitry is, of course, well known in the art and can be either digital or analogue or a combination of both in form. Further description of this means need not be provided.

To detect the control channel, two possibilities are available, as mentioned above, in one embodiment, the control channel pulse comprises an "exalted" pulse, i.e., a pulse which is greater in magnitude than the data pulses. Circuits for detecting such higher amplitude pulses are well known and require no further description.

Figure 8:
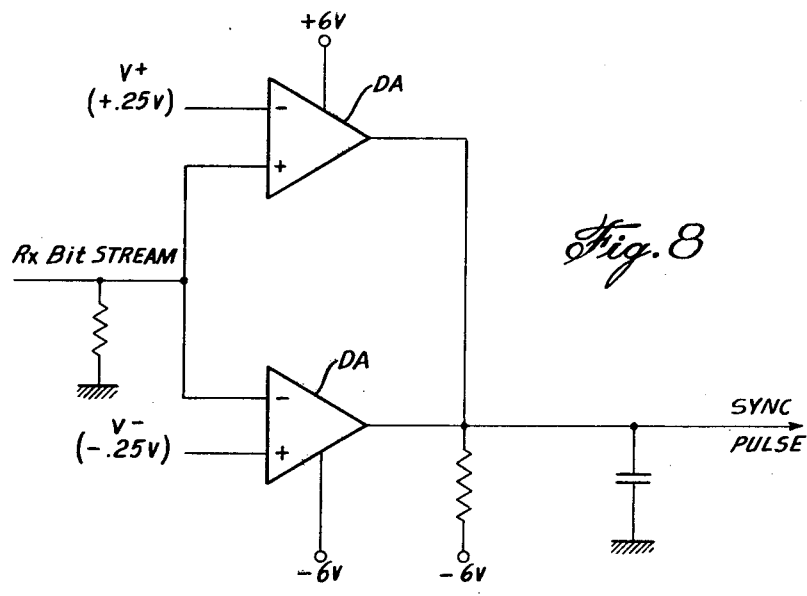
FIGS. 8 and 8A and 8B illustrate a preferred circuit of the control channel and detector and related waveforms.
Figure 8A:
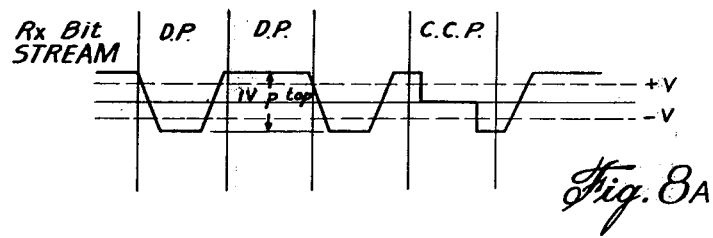

However, in a second embodiment, the control channel pulse is a pulse which has a magnitude of approximately zero. A circuit for detecting such a control channel pulse (CCP) is shown in FIG. 8. Referring to FIG. 8, the circuit consists of two differential amplifiers DA. The positive terminal of one of the differential amplifiers and the negative terminal of the other differential amplifier are both fed in parallel with the received bit stream shown in FIG. 8a. The negative terminal of the first differential amplifier is biased with a voltage of +0.25 volts while the positive terminal of the other differential amplifier is biased with a voltage of −0.25 volts. The outputs of the differential amplifiers are connected together to provide a sync pulse output shown in FIG. 8b.

Figure 8B:
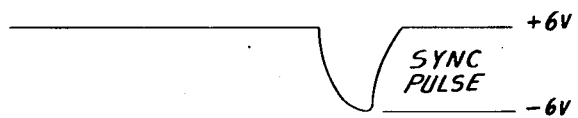

When a data pulse (DP) is applied at the input of the differential amplifiers, then one of the differential amplifiers will conduct so that the output at the sync pulse output will be a voltage of +6 volts as shown in FIG. 8b. However, when the control channel pulse is applied, then neither of the differential amplifiers will conduct so that the output will fall to −6 volts to provide an indication that this is the control channel slot.

Figure 9:
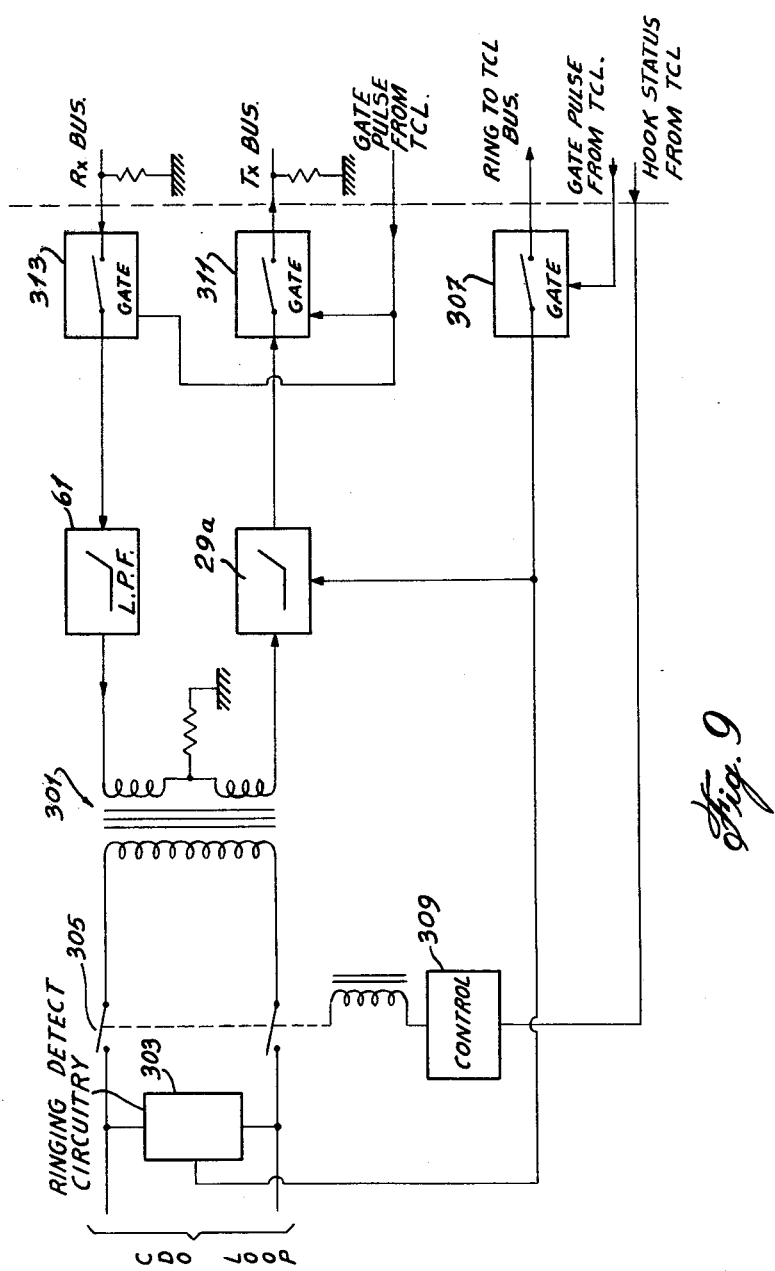
FIG. 9 illustrates a preferred circuit of the CDO interface.

Details of an exemplary circuit of the CDO interface, block 143 in FIG. 5, are illustrated in FIG. 9. The interface will contain 126 of the circuits shown in FIG. 9 when there are 126 subscribers. However, a maximum of only 15 of the circuits be active at any one time in the system being discussed.

Each circuit consists of a two to four wire hybrid 301, a ringing detector circuit 303 across the loop, and a hook relay switch 305 which interrupts the loop. When ringing is detected at the CDO loop, a signal is sent out through the gate 307 to the TCL via the ringing bus. This will activate the TCL to allocate a channel and supply gating signals to operate gates 311 and 313, which allows passage of a low frequency tone via the low pass filter 29a (see also FIG. 2). This tone is detected by 115 in FIG. 4 to cause ringing at the subscriber end.

When the subscriber subsequently removes the receiver from the hook, this will cause an off hook status signal to be transmitted back to the TCL as above described. This signal will in turn activate control means 309 so that the hook relay contacts are closed.

APPENDIX "A"

Introduction

The TCL is a programmed logic array under the control of a read only memory (ROM). The logic array input output controller, program and base station configuration together form an integrated system which is specifically designed and tailored for this specific application. Certain aspects of the logic array may have a very general application, however, others such as the direct memory access (DMA) only have application in this system. (This is not to say that a general purpose mini computer is unable to do the job, only that its add on special purpose interface would be almost the size of the present logic array.)

General Description

The logic array operates on a 2 micro second instruction cycle. The direct memory access (DMA) also operates on a 2 micro second cycle. There is 1 DMA cycle every 8 micro second, hence, there are 3 logic array cycles for every DMA cycle. The DMA cycle commands 1 word of 8 bits to be read from the random access memory (RAM) and placed on the data bus. At the completion of the DMA cycle the information carried by the data bus is strobed into the DMA addressing tree, hence, the DMA addressing tree is updated every 8 micro seconds. $D\phi$ to $D6$ (7 bits) are demultiplexed into 1 of 128 possible states, ($D7$ is not used) states $\phi$ through 127. States 1 through 126 correspond to subscriber 1 through 126 and are wired directly to the multiplexing demultiplexing bilateral switches on the line terminator cards. State $\phi$ is active during the 8 microsecond that the control is being processed. State 127 is active during the 8 microsecond intervals corresponding to non allocated channels, hence, an unmodulated bit stream is transmitted and the received bit stream is ignored. The DMA has access to RAM locations $\phi$ through 15 only, these 16 locations correspond to channels $\phi$ through 15. One of these locations must be set to zero corresponding to the control channel. All not allocated locations must be set to 127 (377 octal or −1). The number of a subscriber allocated to a channel must be entered into the location corresponding to the channel. The DMA is under the control of the I/O controller via the 4 bit channel bus.

The I/O register is an 8 bit parallel in parallel out, serial in, serial out device. This register communicates with the logic array over the 8 bit data bus. The number corresponding to the subscriber to be polled is placed in this register. During the following 1 millisecond these 8 bits are fed one at a time into the addressing tree on the control channel. During the following 1 m second the response to the poll is placed into this register as a serial input one bit at a time from the control channel. When the 8th response bit has been received the I/O controller signals polling end to the logic array. This must be detected and processed by software to initiate the next poll. (There are 48 logic array cycles between end of a poll and the start of the next poll. The software must be written around this fact).

The control channel register is a 4 bit register connected to $D\phi$ through $D3$ (4 bits) of the 8 bit data bus. This register informs the I/O controller of the channel selected for control. When this register is strobed, the same strobe also sets the polling flag initiating a new poll cycle. Hence, the control channel must be transferred from the data bus to this register to initiate a new poll cycle, even if this register already holds the correct information.

The random access addressing tree is similar in operation to the DMA addressing tree. However, information is strobed into this addressing tree from the data bus, under control of the logic array. (i.e., software control via a transfer function). $D\phi$ to $D6$ (7 bits) are again decoded to states $\phi$ through 127 (128 states) states $\phi$ and 127 are not used. The remaining 126 states address the corresponding line terminator cards (one at a time). $D7$ carries the alarm states generated in the logic array. An addressed line terminator card has control of the ringing and equipped busses which inform the logic array via the decision multiplexer of its ringing or equipped status. An addressed card also clocks $D7$ the alarm bit into its alarm register causing a light emitting diode (LED) to be illuminated thus indicating a defective channel.

The received bit stream is processed by the 16 carrier fail detectors. One detector for each channel. The 16 carrier fail signals can be tested by the logic array via the decision and carrier fail multiplexer. The carrier fail multiplexer is under control of the random access memory address registers 4 least significant bits. This was found preferable to having a separate register to control the carrier fail multiplexer as both a saving in hardware and software could be realized.

This concludes the description of that part of the hardware which is special purpose. The remainder of this description applied to the general purpose section of the logic array.

As has already been realized most of the various system blocks communicate with each other over the 8 bit data bus.

There is a second bus of major importance called the control bus. This bus indirectly or directly controls the flow of information on the data bus and the sequence of events which takes place. This bus is driven only by the control read only memory (ROM) hence it is uni-directional. The read only memory is thus the master control element of the system and holds the software or firmware. The ROM has a capacity of 4096 words of 16 bits maximum. However, the prototype system has an estimated need of only 512 words of 16 bits. The ROM address lines are driven from a 12 bit presetable up counter (P'register). At the start of a logic array cycle the ROM output is placed in the output latches (not shown on FIG. 1 but part of ROM) and the 12 bit P'register is incremented. Thus the logic array is processing the current cycle concurrent with the ROM looking up the following cycle. However, should the current cycle be a branch or conditional branch with the previously selected decision true, then the 12 least significant control bus bits (from the ROM) (C$\phi$ to C11) are forced into the P'register. Thus the P'register is forced to an entirely new value defined by the current ROM output in place of taking up the previous value plus 1. For the remaining 1.5 microseconds of the logic array cycle the ROM is looking up the next cycle and the logic array is idle. This accounts for 2 logic array instructions, branch (B) and conditional branch (CB). These are literal class instructions. That is the ROM output bits are placed into a register.

Other literal class instructions are RAM address literal (RAMA). The ROM output bits C$\phi$ to C7 are placed in the RAM address register via the RAM address multiplexer.

Data literal (DL)-ROM output bits C$\phi$ to C7 are placed in the T' or transfer register. From the transfer register, they may be placed onto the data bus. The data bus may also write into the T' register however, the T' register cannot write onto the control bus.

Control literal (CL)-ROM output bits C$\phi$ to C3 are written into the control literal register and are used to control the decision multiplexer. One of 16 decisions can be selected by controlling this multiplexer in conjunction with the conditional branch (CB).

Arithmetic logic function (ALF)-a number of arithmetic or logical operations may be preformed between the A'register and the B'register, the result of these operations are stored in the A'register or accumulator.

Transfer function (TF)—this is probably the most used of all instructions. The transfer function commands 1 and only 1 register to put its information onto the data bus. At the end of the logic array cycle the information on the data bus has been strobed into 1 or all of the registers connected to the data bus. The following registers can write onto the data bus; accumulator, transfer register, RAM, I/O register and the front panel display thumb wheel switches. The following registers can read from the data bus B'register; transfer register, RAM address register, I/O register, control channel register, random access addressing tree register, RAM and the front panel readout display. It is not allowed to make a transfer from RAM to RAM address register, as a race condition exists due to a latched rather than clocked type register operation.

Conditional branches CB and control literals CL (possibly decision literal would be a better description) work together; CL selects one of 16 possible flags, buses or conditions which are tested at a later stage by CB. If the selected flag, bus or condition are true, then the logic array goes to the location specified. Otherwise, it executes the next instruction in sequence. Bit 7 of the accumulator may be tested. If true, the accumulator is holding a negative number. Similarly for bit 7 of the B register. When the carry flag is tested, this is the equivalent of testing the 9th bit of the accumulator and only needs apply to a double precision operation. When the A = B condition is tested and found true the current contents of the accumulator is $-1$ or 377 octal or all 8 bits set to 1. The instruction ALF COMP is equal to ALF A=B−A−1. Thus, if A=B at the start of the instruction, then A=−1 after execution and thus the A=B FLAG was named. However, its also a 377 or −1 or full register flag.

Software Generation

A cross assembler has been produced in the basic language. This assembler can be run on the com-share system. It is simple to use and performs a basic assembly. A sample input listing which offers some explanation is given below.

Three error codes are given in the output listing (not illustrated).

U - Columns 12 through 26 of input line contain something not recognized.

D - This lable is defined twice, the first definition was assumed correct.

L - This lable is not defined.

```
1.  NO-OP   No Opera   n

X 000 XXX XXX XXX XXX

This is a spare code - a no-op is performed.

2.  RAMA   RAM Address Literal

X 001 XXX XLL LLL LLL

The least 8 significant bits of the control word are loaded
    into the RAM address register (Fig. 3).

3.  DL   Data Literal

X 010 XXX XLL LLL LLL

The least 8 significant bits of the control word are loaded
    into the "T" register.
```

4. CL  Control Literal

X Ø11 XXX XXX XXL LLL

The least 4 significant bits of the control word are loaded into the control registers and select the decision to be executed by the Conditional Branch CB  (Instruction 7).

The 16 decisions are as follows:

```
   Ø ØØØ   A, neg
   Ø ØØ1   B, neg
   Ø Ø1Ø   Carry   (Equivalent to a 9th bit in A, REG)
   Ø Ø11   A=B     (Indicates when true that A, register holds 377, -1)

Ø 1ØØ   Ringing
   Ø 1Ø1   Spare
   Ø 11Ø   Spare
   Ø 111   Spare

1 ØØØ   Spare
   1 ØØ1   Spare
   1 Ø1Ø   Carrier *
   1 Ø11   Spare 1 1ØØ   Spare
   1 1Ø1   Spare
   1 11Ø   Polling
   1 111   Slot
   ```

* To test for carrier present the RAM address must first be set to the required channel. Since the RAM address register is also used to select 1 of the 16 carrier fail signals.

NOTE: 1 = Logic 1
   Ø = Logic Ø
   L = Literal data
   X = Do not care (Normally set to zero)

5. ALF  Arithmetic Logic Function

X 1ØØ XXX XX(Shift Right 1 A Register)(X is Logic; Ø is Arithmetic)(X) Carry Input)(XXX) Operation re MC14581)

Arithmetic Logic Functions are performed between the Accumulator A register and the B register. The result is loaded into the Accumulator. The B register remains unchanged.

Examples

```
A = 0      Set A register to zero.
A = B      Set A register equal to B register (B not affected).
A = B+A    Add contents of A to contents of B, save result
           in A (B not affected).
A = B-A    Subtract contents of A from contents of B and save
           results in A (B not affected).
```

Here follows the most used arithmetic operations:

```
A = B      X 100 XXX XX0 000 000
A = 0      X 100 XXX XX0 010 011
A = NB     X 100 XXX XX0 010 000
A = -1     X 100 XXX XX0 000 011

A = B+A    X 100 XXX XX0 000 001
A = 2B     X 100 XXX XX0 001 100
A = B+1    X 100 XXX XX0 100 000
A = B-1    X 100 XXX XX0 001 111

A = B-A    X 100 XXX XX0 100 110
A = A/2    X 100 XXX XX1 XXX XXX

COMP       X 100 XXX XX0 000 110
```

Here follows the most used logic operations performed between the A and B register.

```
AND        X 100 XXX XX0 X11 011
OR         X 100 XXX XX0 X11 110
EXOR       X 100 XXX XX0 X10 110
NAND       X 100 XXX XX0 X10 100

NOR        X 100 XXX XX0 X10 001
NEXOR      X 100 XXX XX0 X11 001
```

6. TF Transfer Function

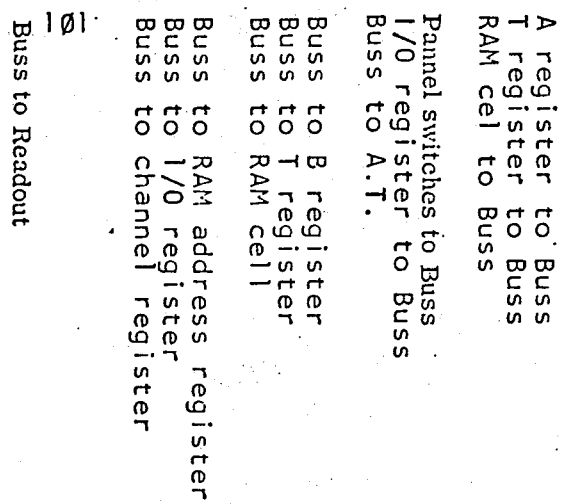

101

- Buss to Readout
- Buss to RAM address register
- Buss to I/O register
- Buss to channel register
- Buss to RAM cell
- Buss to T register
- Buss to B register
- Panel switches to Buss
- I/O register to Buss
- RAM cell to Buss
- T register to Buss
- A register to Buss This instruction allows the registers to write and read from the data Buss.

N.B. Only one register is permitted to write on the buss at any time.

7.  CB   Conditional Branch

X 110 LLL LLL LLL LLL

This is a Conditional Jump instruction. If the condition
    selected by the Control register (instruction 4) is true,
    then the program pointer (ROM address) is forced to that
    of the 12 least significant bits of the control word 8.  B   Branch

X 111 LLL LLL LLL LLL

This is a simple Jump instruction. The program pointer is
    set to the 12 least significant bits of the control word

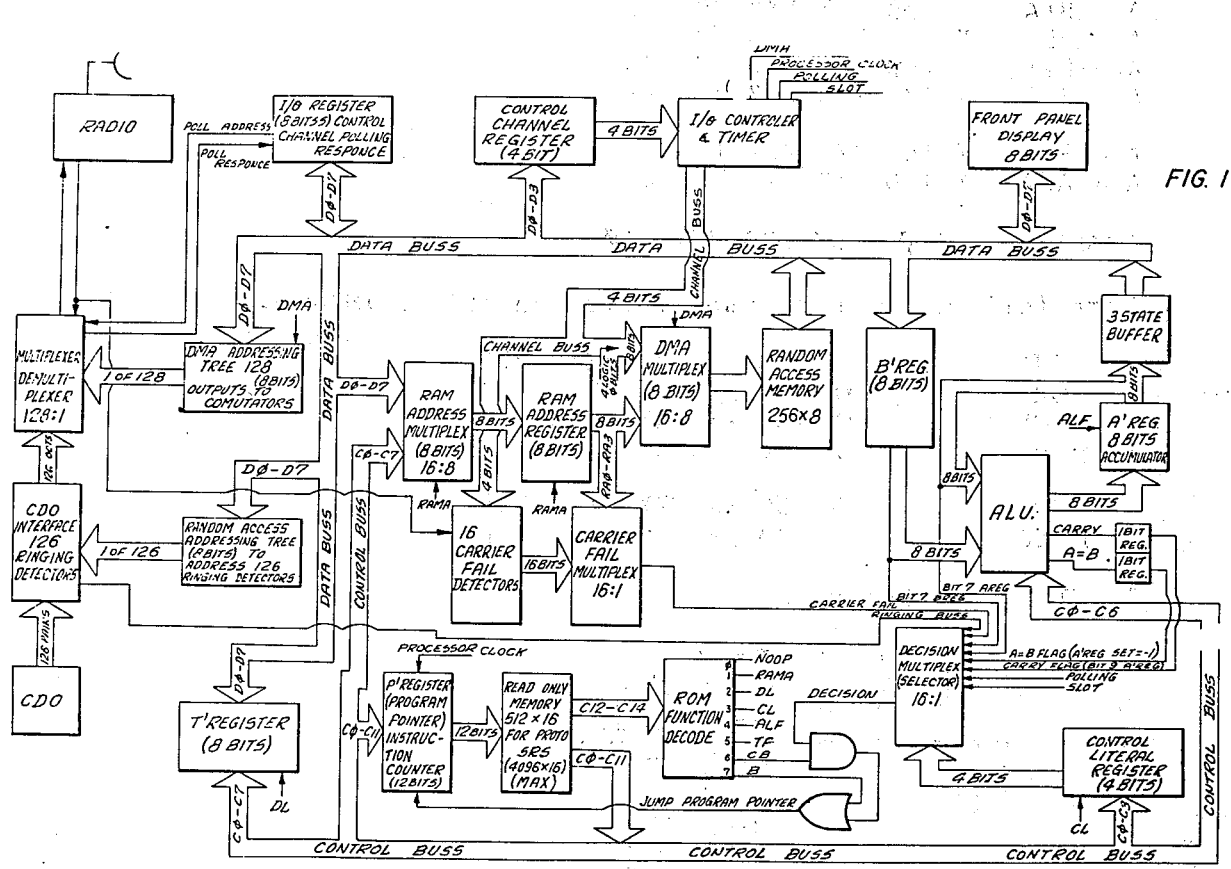

FIG. 1

APPENDIX "B"

MICRO-PROCESSOR ASSEMBLER REFERENCE GUIDE

"* THE ASTERIC DEFINES ENTIRE LINE AS COMMENT."

"* EVERY LINE MUST OPEN AND CLOSE WITH QUOTE MARKS."

```
"WORD      EQU   Ø12      RAM LOCATION OCTAL 12 DEFINED AS WORD."
"          ORG   16       SETS ADDRESS TO OCTAL 16."
"START     DL    Ø        PROGRAM STARTS AT LOCATION 16."
"          CL    RINGING  "
```

APPENDIX "B"

MICRO-PROCESSOR ASSEMBLER REFERENCE GUIDE

```
"          RAMA  WORD      SAME AS RAMA 12."

"          TF    T,B,M     T,REG TO B,REG AND RAM."

"          TF    A,R,A.T.  A,REG TO RAM ADDRESS REG AND RANDOM ACCESS"
"*                         ADDRESSING TREE."

"          TF    T,B        "

"          TF    A,M        "

"          ALF   OR         "

"          ALF   AND        "

"          ALF   A=B        "

"          ALF   A=B-1      "

"* THE ASTERIC DEFINES ENTIRE LINE AS COMMENT."

"* EVERY LINE MUST OPEN AND CLOSE WITH QUOTE MARKS."

"WORD      EQU   Ø12       RAM LOCATION OCTAL 12 DEFINED AS WORD."

"          ORG   16        SETS ADDRESS TO OCTAL 16."

"START     DL    Ø         PROGRAM STARTS AT LOCATION 16."

"          CL    RINGING    "

"          RAMA  WORD      SAME AS RAMA 12."

"          TF    T,B,M     T,REG TO B,REG AND RAM."

"          TF    A,R,A.T.  A,REG TO RAM ADDRESS REG AND RANDOM ACCESS"
"*                         ADDRESSING TREE."

"          TF    T,B        "

"          TF    A,M        "

"          ALF   OR         "

"          ALF   AND        "

"          ALF   A=B        "

"          ALF   A=B-1      "

"          DATA  123456    123456 IS ENTERED IN THIS LOCATION."

"          DATA  765432    USEFUL WHEN ASSEMBER CANNOT PROCESS COMMAND."

"ZIP       CB    START     GOTO START IF RINGING."

"          B     $-1       SAME AS B  ZIP."

"          END             DIRECTS ASSEMBLER TO END ASSEMBLY."

"*"

"* N.B. COLUMNS 12,17,27 ARE RIDGID."
```

APPENDIX "C"
sheet. 1
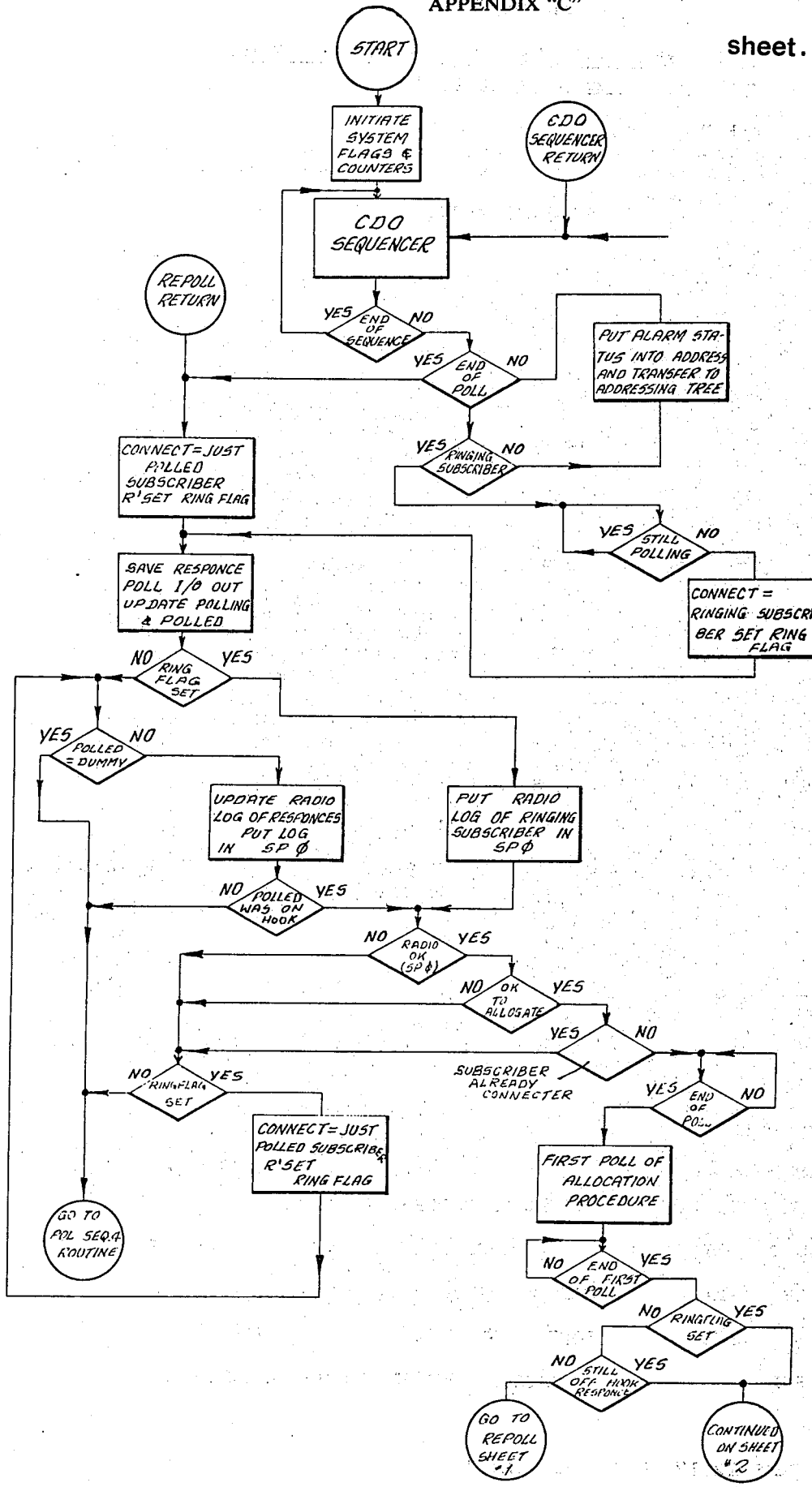

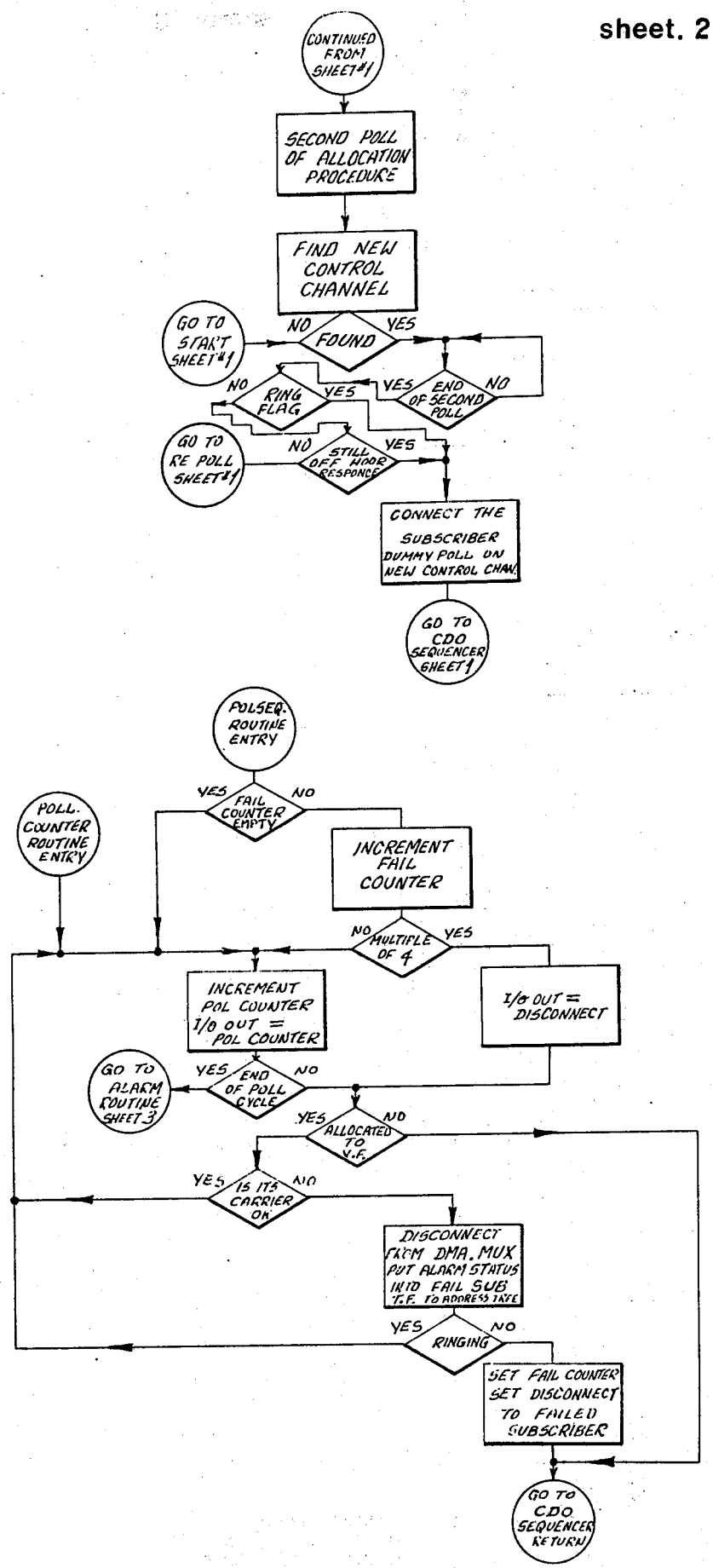

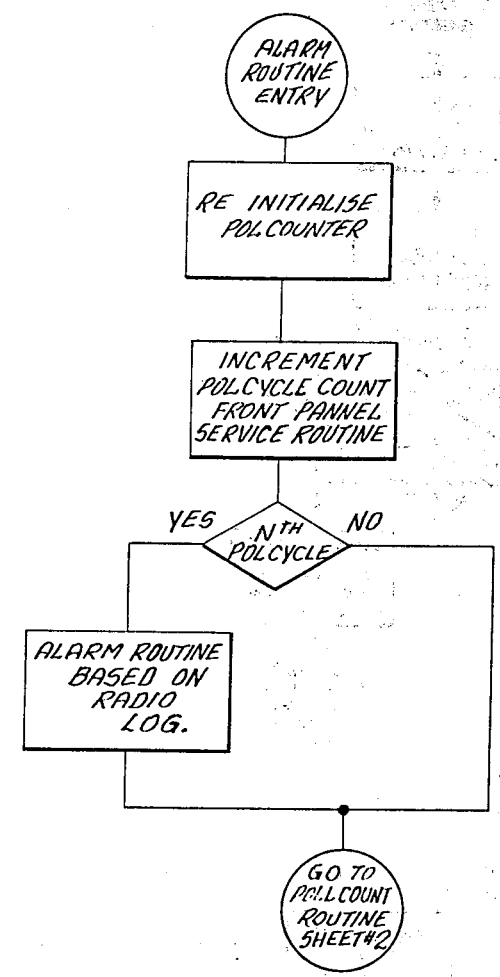

APPENDIX "D"

```
...1........-DC0000       *       PROTOTYPE SRS PROGRAM.
...2........-DC0000       *       USE BASE STATION CONTROL.
...3........-DC0000       *       AUTHOR IAN CHAPMAN.
...4........-DC0000       *       FARINON ELECTRIC OF CANADA,
...5........-DC0000       *       657 ORLY AVE,
...6........-DC0000       *       DORVAL H9P-1G1 ,
...7........-DC0000       *       QUEBEC.
...8........-DC0000       *       DATE WRITTEN = 18 JAN 1974.
...9........-DC0000       *       UPDATED = 21 JUNE  1974.
..10........-DC0000       *       UPDATED =  4 MAY   1974.
..11........-DC0000       *       UPDATED = 16 APRIL 1974.
..12........-DC0000       *       UPDATED = 10 APRIL 1974.
..13........-DC0000       ***********************************************************
..14........-DC0000       *
..15........-DC0000       *       EQUALS SECTION.
..16........-DC0000       *
..17........-DC0000       *
..18........-DC0000       CH0       EQU   0
..19........-DC0000       CH1       EQU   1
..20........-DC0000       CH2       EQU   2
..21........-DC0000       CH3       EQU   3
..22........-DC0000       CH4       EQU   4
..23........-DC0000       CH5       EQU   5
..24........-DC0000       CH6       EQU   6
..25........-DC0000       CH7       EQU   7
..26........-DC0000       CH8       EQU   10
..27........-DC0000       CH9       EQU   11
..28........-DC0000       CH10      EQU   12
..29........-DC0000       CH11      EQU   13
..30........-DC0000       CH12      EQU   14
..31........-DC0000       CH13      EQU   15
..32........-DC0000       CH14      EQU   16
..33........-DC0000       CH15      EQU   17
..34........-DC0000       I/OOUT    EQU   20
..35........-DC0000       POLLING   EQU   21   NEXT SUBSCRIBER TO BE POLLED.
..36........-DC0000       POLLED    EQU   22   SUBSCRIBER BEING POLLED.
..37........-DC0000       ALLOCATE  EQU   30   PREVIOUS SUBSCRIBER POLLED.
..38........-DC0000       RINGFLAG  EQU   31   BECOMES 0 ON 15TH VF ALLOCATION.
..39........-DC0000       MAINFLAG  EQU   32
```

```
..40...--------D000000   ATCOUNT   EQU  33
..41...--------D000000   I/OIN     EQU  34
..42...--------D000000   CONTCH    EQU  40
..43...--------D000000   ALARMCLK  EQU  41      ALARM CALCULATION EVERY 64 SECS.
..44...--------D000000   CONNECT   EQU  42      SUBSCRIBER REQUESTING VF CHANNEL.
..45...--------D000000   SPO       EQU  47      TEMPORARY STORAGE.
..46...--------D000000   POLLCOUNT EQU  50
..47...--------D000000   FAIL      EQU  51
..48...--------D000000   DEFECT    EQU  52
..49...--------D000000   *************************************************************
..50...--------D000000   *
..51...--------D000000   *
..52...--------D000000   *         EXECUTION SECTION.
..53...--------D000000   *
..54...--------D000000   *
..55...--------D000000             ORG  0
..56...A000000D020000    START     DL   0
..57...A000001D040023              ALF  A=0
..58...A000002D030003              CL   A=B
..59...A000003D051101    LOOP1     TF   A,B,R        LOOP1 SETS ALL RAM TO 0.
..60...A000004D050402              TF   T,M
..61...A000005D040040              ALF  A=B+1
..62...A000006D060010              CB   $+2          256 LOCATION ?
..63...A000007D070003              B    LOOP1        NO,- RETURN LOOP1.
..64...A000010D020023              DL   23           MEMORY CELLS 0 - 18 TO -1.
..65...A000011D050102              TF   T,B
..66...A000012D020377              DL   377          DECIMAL NEG 1.
..67...A000013D040017    LOOP2     ALF  A=B-1        LOOP2 SETS CH0 - CH15 TO -1
..68...A000014D060020              CB   QUIT2        THUS LOOP2 DISCONNECTS ALL SUBSCRIBERS VF.
..69...A000015D051101              TF   A,B,R
..70...A000016D050402              TF   T,M
..71...A000017D070013              B    LOOP2
..72...A000020D010030    QUIT2     RAMA ALLOCATE     SET LOCATION ALLOCATE.
..73...A000021D020016              DL   16           DECIMAL POS 14.
..74...A000022D050402              TF   T,M
..75...A000023D010032              RAMA MAINFLAG     SET MAINFLAG.
..76...A000024D020347              DL   347
..77...A000025D050402              TF   T,M
..78...A000026D010050              RAMA POLLCOUNT    SET POLLCOUNTER.
..79...A000027D020200              DL   200
..80...A000030D050402              TF   T,M
..81...A000031D010000              RAMA CH0          CHANNEL IS CONTROL CHANNEL ON START UP.
..82...A000032D020000              DL   0
..83...A000033D050402              TF   T,M
..84...A000034D010033    INIT      RAMA ATCOUNT      INITILIZE CDO INTERFACE TEST ROUTINE.?
..85...A000035D020200              DL   200
..86...A000036D050102              TF   T,B
..87...A000037D040040    TESTER    ALF  A=B+1
..88...A000040D030003              CL   A=B          TEST FOR LAST SUBSCRIBER.
..89...A000041D060034              CB   INIT         REINIT AND RESTART CDO TEST SEQUENCE.
..90...A000042D020177              DL   177          SET MSB TO INDICATE ALARM STATUS
..91...A000043D050102              TF   T,B
..92...A000044D050401              TF   A,M          OF SUBSCRIBER BEFORE TRANSFERING
..93...A000045D051201              TF   A,T,R
..94...A000046D040000              ALF  A=B          ADDRESS CODE TO THE ADDRESSING TREE.
..95...A000047D050104              TF   M,B
..96...A000050D040036              ALF  OR
..97...A000051D050102              TF   T,B
..98...A000052D040033              ALF  AND
..99...A000053D050041              TF   A,A.T.
.100...A000054D030016    TESTLOOP  CL   POLLING      CHECK FOR END OF POLL.
.101...A000055D060063              CB   REPOLL       IF END OF POLL THEN REPOLL.
.102...A000056D030004              CL   RINGING      YES SO TEST RINGER.
.103...A000057D060255              CB   RINGING      GOTO RINGING SERVICE ROUTINE.
.104...A000060D010033    CDOSEQRTN RAMA ATCOUNT
.105...A000061D050104              TF   M,B
.106...A000062D070037              B    TESTER       NOT RINGING SO TEST NEXT ADDRESS.
.107...--------D000000   *
.108...--------D000000   *
.109...A000063D010021    REPOLL    RAMA POLLING      TRY TO CONNECT CURRENT SUBSCRIBER.
.110...A000064D050204              TF   M,T
.111...A000065D010042              RAMA CONNECT
.112...A000066D050402              TF   T,M
.113...A000067D010031              RAMA RINGFLAG     RESET RINGING FLAG.
.114...A000070D020000              DL   0
.115...A000071D050402              TF   T,M
.116...A000072D010020    POLENTER  RAMA I/OOUT       NEXT SUBSCRIBER TO BE POLLED.
.117...A000073D050204              TF   M,T
.118...A000074D010034              RAMA I/OIN        RINGING ENTERS HERE.
.119...A000075D050420              TF   I/O,M        SAVE SUBSCRIBER RESPONCE.
.120...A000076D052002              TF   T,I/O        SUBSCRIBER TO BE POLLED IN I/O BUFFER.
.121...A000077D010020              RAMA CONTCH
.122...A000100D054004              TF   M,CHAN       CONTROL CHANNEL TO I/O LOGIC.
.123...A000101D010021              RAMA POLLING      UPDATE POLLED AND POLLING.
.124...A000102D050104              TF   M,B
.125...A000103D050402              TF   T,M
.126...A000104D040000              ALF  A=B
.127...A000105D010022              RAMA POLLED
```

```
.128...A0001060050401              TF     A,M
.129...A0001070010031    RINGNOCON RAMA   RINGFLAG  RINGING FAILED TO CONNECT,TEST ON PREVIOUSLY
.130...A0001100050104              TF     M,B       POLLED SUBSCRIBER STARTS HERE.
.131...A0001110030001              CL     B,NEG     IF RINGING BYPASS DUMMY TEST.
.132...A0001120060204              CB     RADIOTST  ITS RINGING.
.133...A0001130030003              CL     A=B       A HOLDS SUBSCRIBER JUST POLLED.
.134...A0001140060423              CB     POLSEQU   LAST POLL WAS A DUMMY.
.135...--------D000000   *
.136...--------D000000   *
.137...A0001150010042    RADIOLOG  RAMA   CONNECT   PUT RADIO LOG OF SUBSCRIBER INTO
.138...A0001160050204              TF     M,T       A,REG,B,REG AND SPO.
.139...A0001170051002              TF     T,R
.140...A0001200050104              TF     M,B
.141...A0001210010047              RAMA   SPO
.142...A0001220040000              ALF    A=B
.143...A0001230050401              TF     A,M
.144...A0001240020010              DL     010       IS THIS A LOG OF ON OR OFF HOOK RESPONCES ?
.145...A0001250050102              TF     T,B
.146...A0001260040033              ALF    AND
.147...A0001270040006              ALF    COMP
.148...A0001300030003              CL     A=B
.149...A0001310010034              RAMA   I/OIN     PREPARE TO TEST CURRENT RESPONCE TO POLL.
.150...A0001320050104              TF     M,B
.151...A0001330020376              DL     376
.152...A0001340010047              RAMA   SPO
.153...A0001350060167              CB     OFFHOOK   ITS A LOG OF OFF HOOK RESPONCE.
.154...A0001360040000              ALF    A=B       CONTINUE TESTING CURRENT RESPONCE.
.155...A0001370050102              TF     T,B
.156...A0001400040036              ALF    OR
.157...A0001410060173              CB     ONOFF     RECORDING ON HOOK NOW ITS OFF HOOK.
.158...A0001420050104    ONON      TF     M,B       RECORDING ON HOOK STILL ON HOOK.
.159...A0001430040000              ALF    A=B       )TEST LOG FOR FULL CONTINU:TY.
.160...A0001440020370              DL     370
.161...A0001450050102              TF     T,B
.162...A0001460040036              ALF    OR
.163...A0001470060156              CB     LSTHKTST  CONTINIOUS SO BYPASS ANY UPDATE.
.164...A0001500050104              TF     M,B       UP DATE LOG.
.165...A0001510040040              ALF    A=B+1
.166...A0001520010042    RETNLOG   RAMA   CONNECT   REPLACE LOG.
.167...A0001530050204              TF     M,T
.168...A0001540051002              TF     T,R
.169...A0001550050401              TF     A,M
.170...A0001560010034    LSTHKTST  RAMA   I/OIN     LAST HOOK TEST.
.171...A0001570050104              TF     M,B
.172...A0001600040000              ALF    A=B
.173...A0001610020376              DL     376
.174...A0001620050102              TF     T,B
.175...A0001630040036              ALF    OR
.176...A0001640010047              RAMA   SPO       OLD LOG IN SPO.
.177...A0001650060207              CB     TSTRADIO  SUBSCRIBER ON HOOK TO POLSEQU
.178...A0001660070423              B      POLSEQU
.179...A0001670040000    OFFHOOK   ALF    A=B       I/OIN IN A,REG.
.180...A0001700050102              TF     T,B       376 IN B,REG.
.181...A0001710040036              ALF    A=BORA
.182...A0001720060142              CB     ONON      ACTUALLY ITS OFFOFF.
.183...A0001730050104    ONOFF     TF     M,B       ALSO OFFON.
.184...A0001740040000              ALF    A=B       LOG IN A,REG.
.185...A0001750020370              DL     370
.186...A0001760050102              TF     T,B
.187...A0001770040033              ALF    A=BANDA   CONTINUITY COUNTER SET TO ZERO.
.188...A0002000020010              DL     010
.189...A0002010050102              TF     T,B
.190...A0002020040026              ALF    A=BEXORA  BIT4 REVERSED.
.191...A0002030070152              B      RETNLOG   REPLACE UPDATED LOG.
.192...A0002040010042    RADIOTST  RAMA   CONNECT   ENTERS HERE IF RINGING.
.193...A0002050050204              TF     M,T
.194...A0002060051002              TF     T,R
.195...A0002070050104    TSTRADIO  TF     M,B       ENTERS HERE IF OFF HOOK.
.196...A0002100040000              ALF    A=B       LOG IN A,REG.
.197...A0002110020370              DL     370
.198...A0002120030003              CL     A=B
.199...A0002130050102              TF     T,B
.200...A0002140040036              ALF    A=BORA
.201...A0002150060232              CB     ALTETST   GOTO ALLOCATE TEST.
.202...A0002160010031    POLSEQRTN RAMA   RINGFLAG  TEST RINGFLAG.
.203...A0002170050104              TF     M,B
.204...A0002200040000              ALF    A=B
.205...A0002210060223              CB     $+2
.206...A0002220070423              B      POLSEQU   IF NOT SET RETURN VIA POLSEQUENSER.
.207...A0002230020000              DL     0         IF SET RETURN AND SERVICE LAST POLL.
.208...A0002240050402              TF     T,M       POLLING A DUMMY NOW BUT PRIOR POLL WAS VALID.
.209...A0002250010022              RAMA   POLLED
.210...A0002260050402              TF     T,M
.211...A0002270010042              RAMA   CONNECT   PUT PRIOR POLL INTO CONNECT.
.212...A0002300050402              TF     T,M
.213...A0002310070107              B      RINGNOCON
.214...A0002320010030    ALTETST   RAMA   ALLOCATE  ARE ALL 15 CHANNELS IN USE ?
```

```
.215...A0002330050104              TF      M,B
.216...A0002340040000              ALF     A=B
.217...A0002350060216              CB      POLSEQRTN  YES.
.218...A0002360020020              DL      20         TEST IF ALREADY CONNECTED.
.219...A0002370050102    LOOP3     TF      T,B
.220...A0002400040017              ALF     A=B-1
.221...A0002410060252              CB      QUIT3      END OF LOOP START CONNECT SEQUENCE.
.222...A0002420051201              TF      A,T,R      CHANNEL IN RAM ADDRESS.
.223...A0002430050104              TF      M,B
.224...A0002440040000              ALF     A=B        SUBSCRIBER ALLOCATED TO CHANNEL IN A,REG.
.225...A0002450010042              RAMA    CONNECT
.226...A0002460050104              TF      M,B        SUBSCRIBER TO BE CONNECTED IN B,REG.
.227...A0002470040036              ALF     COMP       IS SUBSCRIBER IN THIS CHANNEL ?
.228...A0002500060216              CB      POLSEQRTN  ITS ALREADY CONNECTED.
.229...A0002510070237              B       LOOP3      TEST NEXT CHANNEL.
.230...--------D000000    *
.231...--------D000000    *
.232...A0002520030016    QUIT3     CL      POLLING    END OF POLL ?
.233...A0002530060266              CB      FIRSTPOLL  YES.
.234...A0002540070253              B       $-1        NO,TRY AGAIN.
.235...A0002550010042    RINGING   RAMA    CONNECT    RING SERVICE ROUTINE.
.236...A0002560050402              TF      T,M        TRY TO CONNECT RINGING SUBSCRIBER.
.237...A0002570010031              RAMA    RINGFLAG   SET RINGING FLAG.
.238...A0002600020377              DL      377
.239...A0002610050402              TF      T,M
 240...A0002620010021              RAMA    POLLING
.241...A0002630030016              CL      POLLING
.242...A0002640060072              CB      POLENTER   T,REG HOLDS 377 DUMMY.
.243...A0002650070264              B       $-1        NOT END OF POLL TRY AGAIN.
.244...A0002660010042    FIRSTPOLL RAMA    CONNECT    REPOLL WITH FIRST CONNECT POLL.
.245...A0002670052004              TF      M,I/O
.246...A0002700010040              RAMA    CONTCH
.247...A0002710054004              TF      M,CHAN
.248...A0002720010031              RAMA    RINGFLAG   RINGFLAG IN B,REG.
.249...A0002730050104              TF      M,B        AND INTO A,REG
.250...A0002740040000              ALF     A=B
.251...A0002750030016              CL      POLLING    END OF POLL ?
.252...A0002760060303              CB      $+2
.253...A0002770070276              B       $-1        NO,TRY AGAIN.
.254...A0003000030003              CL      A=B        YES.
.255...A0003010060311              CB      2NDPOLL    RINGING FLAG SGT.
.256...A0003020050120              TF      I/O,B      NO,SO TEST OFF HOOK RESPONCE.
.257...A0003030040000              ALF     A=B
.258...A0003040020376              DL      376
.259...A0003050050102              TF      T,B
.260...A0003060040036              ALF     OR
.261...A0003070060311              CB      2NDPOLL
.262...A0003100070346              B       REPOLRTN   ITS ON HOOK SO RETURN VIA REPOLRTN.
.263...A0003110010042    2NDPOLL   RAMA    CONNECT    ITS OFF HOOK SO POLL AGAIN.
.264...A0003120052004              TF      M,I/O
.265...A0003130010040              RAMA    CONTCH
.266...A0003140054004              TF      M,CHAN
.267...A0003150020020              DL      20         TO FIND NEW CONTROL CHANNEL.
.268...A0003160050102    LOOP4     TF      T,B        DEC 16 IN B,REG ON START UP.
.269...A0003170040017              ALF     A=B-1      DECREMENT AND TEST NEXT CHANNEL.
.270...A0003200051201              TF      A,T,R
.271...A0003210060000              CB      START      TESTED ALL 16 CHANNELS ! ALL IN USE,
.272...A0003220050104              TF      M,B        HENCE THERE IS AN ALLOCATION ERROR.
.273...A0003230040000              ALF     A=B        NEXT CHANNEL IN A,REG.
.274...A0003240060326              CB      QUIT4      THIS CHANNEL IS EMPTY.
.275...A0003250070316              B       LOOP4
.276...A0003260010047    QUIT4     RAMA    SPO        SAVE NEW CONTROL CHANNEL IN SPO.
.277...A0003270050402              TF      T,M
.278...A0003300010031              RAMA    RINGFLAG   PUT RINGFLAG IN A,REG.
.279...A0003310050104              TF      M,B
.280...A0003320040000              ALF     A=B
.281...A0003330030016              CL      POLLING    WAIT FOR END OF 2ND POLL.
.282...A0003340060336              CB      $+2
.283...A0003350070334              B       $-1
.284...A0003360030003              CL      A=B
.285...A0003370060352              CB      CONSUB     IF RINGFLAG CONNECT.
.286...A0003400050120              TF      I/O,B      OTHERWISE TEST HOOK RESPONCE.
.287...A0003410040000              ALF     A=B        STILL OFF HOOK THEN CONNECT.
.288...A0003420020376              DL      376
.289...A0003430050102              TF      T,B
.290...A0003440040036              ALF     OR
.291...A0003450060352              CB      CONSUB
.292...A0003460020377    REPOLRTN  DL      377
.293...A0003470010021              RAMA    POLLING    SET POLLING TO DUMMY.
.294...A0003500050402              TF      T,M
.295...A0003510070063              B       REPOLL     AND START NEXT POLL PER I/OOUT.
.296...--------D000000    *
.297...--------D000000    *
.298...A0003520010021    CONSUB    RAMA    POLLING    377 IN A,REG ON ENTRY.
.299...A0003530052401              TF      A,M,I/O    SET UP A DUMMY POLL.
.300...A0003540010047              RAMA    SPO        SPO HOLDS NEW CONTROL CHANNEL.
.301...A0003550050204              TF      M,T        NEEW CONTROL CHANNEL IN T,REG.
.302...A0003560010040              RAMA    CONTCH
```

```
.303...A000357D050104              TF    M,B       OLD CONTROL CHANNEL IN B,REG.
.304...A000360D050402              TF    T,M       SAVE NEW CONTROL CHANNEL.
.305...A000361D040000              ALF   A=B       OLD CONTROL CHANNEL IN A,REG.
.306...A000362D040000              ALF   A=B       OLD CONTROL CHANNEL IN A,REG.
.307...A000363D010042              RAMA  CONNECT
.308...A000364D050204              TF    M,T       SUBSCRIBER TOBE CONNECTED IN T,REG.
.309...A000365D051001              TF    A,R       OLD CONTROL CHANNEL IN RAM ADDRESS.
.310...A000366D050402              TF    T,M       SUBSCRIBER CONNECTED TO DMA MUX SWITCHES.
.311...A000367D051002              TF    T,R       SET NEW SUBSCRIBER RADIO LOG
.312...A000370D020017              DL    17        TO CONSISTENTLY OFF HOOK.
.313...A000371D050402              TF    T,M
.314...A000372D030017              CL    SLOT      TO CHANGE CHANNEL - WAIT UNTILL -
.315...A000373D010040              RAMA  CONTCH    OLD CONT CHANLESS 1,THUS ALL SUBSCRIBER
.316...A000374D050204              TF    M,T       STATIONS WILL GO WIDE BAND.BE ABLE TO
.317...A000375D051002              TF    T,R       ACCEPTTHE EXPUL ON THE NEW CHANNEL.
.318...A000376D040023              ALF   A=0       THE EXPUL MUST NOT ARRIVE BEFORE WIDEBAND.
.319...A000377D060377              CB    $         TRAPPED HERE UNTILL OLD CONT CHAN LESS 1.
.320...A000400D054002              TF    T,CHAN    NEW CONTROL CHANNEL TO I/O.
.321...A000401D050401              TF    A,M       INHIBIT MUX SWITCHES ON CONT CHAN.
.322...A000402D010030              RAMA  ALLOCATE
.323...A000403D050104              TF    M,B
.324...A000404D040017              ALF   A=B-1     UPDATE ALLOCATE.
.325...A000405D050401              TF    A,M
.326...A000406D010052              RAMA  DEFECT    IS SUBSCRIBER CONNECTED IN THE DISCONNECT
.327...A000407D050104              TF    M,B       LOOP ?
.328...A000410D040000              ALF   A=B
.329...A000411D010042              RAMA  CONNECT
.330...A000412D050104              TF    M,B
.331...A000413D030000              CL    A=B
.332...A000414D040006              ALF   COMP
.333...A000415D060417              CB    $+2
.334...A000416D070060              B     CDOSEQRTN NO.
.335...A000417D010051              RAMA  FAIL      YES SO REMOVE IT FROM THE DISCONNECT LOOP.
.336...A000420D020000              DL    0
.337...A000421D050402              TF    T,M
.338...A000422D070060              B     CDOSEQRTN
.339...------D000000      *
.340...------D000000      *
.341...------D000000      *
.342...A000423D010051   POLSEQU    RAMA  FAIL      IS A DISCONNECT IN PROGRESS ?
.343...A000424D050104              TF    M,B
.344...A000425D040017              ALF   A=B-1
.345...A000426D030000              CL    A=B
.346...A000427D060456              CB    NEXTPOL
.347...A000430D050401              TF    A,M       A DISCONNECT IS IN PROGRESS.
.348...A000431D020374              DL    374       SHOULD IT BE POLLED NEXT POLL ?
.349...A000432D050102              TF    T,B
.350...A000433D040036              ALF   OR
.351...A000434D060436              CB    $+2
.352...A000435D070456              B     NEXTPOL   NO,CARRY ON IN NORMAL POLLING SEQUENCE.
.353...A000436D010052              RAMA  DEFECT    YES,POLL DISCONNECTION.
.354...A000437D050204              TF    M,T
.355...A000440D010020              RAMA  I/OOUT
.356...A000441D050402              TF    T,M
.357...A000442D020020   ALLOTED    DL    20        BEFORE POLLING TEST TO SEE IF ALREADY.
.358...A000443D050102   LOOP5      TF    T,B       ALLOCATED.
.359...A000444D040017              ALF   A=B-1
.360...A000445D060060              CB    CDOSEQRTN ITS NOT CONNECTED.
.361...A000446D051201              TF    A,T,R
.362...A000447D050104              TF    M,B
.363...A000450D040000              ALF   A=B
.364...A000451D010020              RAMA  I/OOUT
.365...A000452D050104              TF    M,B
.366...A000453D040006              ALF   COMP
.367...A000454D060555              CB    CARRTEST  YES,ITS ALLOCATED.
.368...A000455D070443              B     LOOP5
.369...A000456D010050   NEXTPOL    RAMA  POLLCOUNT CARRIER WAS OK SO TRY TO FIND A
.370...A000457D050104              TF    M,B       SUBSCRIBER TO POLL.
.371...A000460D040040              ALF   A=B+1
.372...A000461D030003              CL    A=B       LAST SUBSCRIBER IN SEQUENCE #128 ?
.373...A000462D060467              CB    ALARMEXEC
.374...A000463D050401              TF    A,M       NO SO TRY TO POLL IT,BUT TEST IT FIRST.
.375...A000464D010020              RAMA  I/OOUT    SUBSCRIBER IN I/OOUT.
.376...A000465D050401              TF    A,M
.377...A000466D070442              B     ALLOTED
.378...A000467D020200   ALARMEXEC  DL    200       SHORT ALARM ROUTINE.
.379...A000470D050402              TF    T,M       MORE ADVANCED ROUTINE WILL BE PRODUCED
.380...A000471D051010              DATA  051010    PANEL SWITCHES TO RAMA
.381...A000472D150004              DATA  150004    M TO PANEL
.382...A000473D010041              RAMA  ALARMCLK  TEST FOR ALARM UPDATE.
.383...A000474D050104              TF    M,B
.384...A000475D040040              ALF   A=B+1
.385...A000476D050401              TF    A,M
.386...A000477D060501              CB    $+2
.387...A000500D070456              B     NEXTPOL   NORMAL POLL CYCLE.
.388...A000501D020200              DL    200       UPDATE ALARM INFORMATION IN RADIO LOGS.
.389...A000502D010047              RAMA  SPO       INITILISE CALCULATION POINTERS
```

```
.390...A000503D050402              TF      T,M         SPO USED AS POINTER.
.391...A000504D010047    LOOP6     RAMA    SPO
.392...A000505D030003              CL      A=B
.393...A000506D050104              TF      M,B
.394...A000507D040040              ALF     A=B+1       POINT TO NEXT RADIO LOG.
.395...A000510D020370              DL      370         MASK FOR RADIO LOG LAST 3 BITS.
.396...A000511D050102              TF      T,B         MASK IN B,REG.
.397...A000512D050601              TF      A,M,T       POINTER IN T,REG AND SPO.
.398...A000513D051001              TF      A,R         RAMA SET TO POINTER.
.399...A000514D060540              CB      QUIT6       QUIT LOOP6.
.400...A000515D040000              ALF     A=B         MASK IN A,REG.
.401...A000516D050104              TF      M,B         RADIO LOG IN B,REG.
.402...A000517D040036              ALF     OR          370 OR RADIO LOG IN A,REG.
.403...A000520D060522              CB      $+2         A,REG IS 377 HENCE RADIO WAS OK.
.404...A000521D030001              CL      B,NEG       B,REG HOLDS SUBSCRIBER RADIO LOG.
.405...A000522D060535              CB      TSTPOL      BYPASS IF ALARM STILL SET.
.406...A000523D040000              ALF     A=B         ROUTINE TO GENERATE THE ALARM.
.407...A000524D020100              DL      100         FIRST ENTRY SET BIT 6.
.408...A000525D050102              TF      T,B         SECOND ENTRY SET BIT 7,GIVING ALARM STATUS.
.409...A000526D040011              ALF     A=B+A       THIRD IS BYPASSED.
.410...A000527D070534              B       SETALMRTN   RETURN TO LOOP6.
.411...A000530D040000    SETBPASS  ALF     A=B         RESTORE RADIO LOG.
.412...A000531D020017              DL      017
.413...A000532D050102              TF      T,B         KILL ANY ALARM.
.414...A000533D040033              ALF     AND
.415...A000534D050401    SETALMRTN TF      A,M
.416...A000535D030016    TSTPOL    CL      POLLING     IF END OF POLL,START A DUMMY POLL
.417...A000536D060543              CB      CALPOLEND   TO OBTAIN CALCULATION TIME.
.418...A000537D070504              B       LOOP6       END OF LOOP.
.419...A000540D030016    QUIT6     CL      POLLING     T,REG HOLDS 377 ON ENTRY FROM LOOP6.
.420...A000541D060543              CB      $+2
.421...A000542D070541              B       $-1         T,REG STILL 377.
.422...A000543D010021    CALPOLEND RAMA    POLLING     T,REG HOLDS 017 ON ENTRY FROM LOOP6.
.423...A000544D040003              ALF     A=-1        DUMMY POLL.
.424...A000545D052401              TF      A,I/O,M
.425...A000546D010040              RAMA    CONTCH
.426...A000547D054004              TF      M,CHAN      ON NORMAL CONTROL CHANNEL.
.427...A000550D050102              TF      T,B         T,REG HOLD 377 IF END OF LOOP6.
.428...A000551D040000              ALF     A=B         T,REG HOLD 017 IF NOT END OF LOOP6.
.429...A000552D030003              CL      A=B
.430...A000553D060456              CB      NEXTPOL     NOT END OF LOOP.
.431...A000554D070504              B       LOOP6       END OF LOOP.
.432...A000555D051002    CARRTEST  TF      T,R         RAM ADDRESS STILL SET TO CONNECTED CHANNEL.
.433...A000556D030015              CL      CARRIER
.434...A000557D060456              CB      NEXTPOL
.435...A000560D040000              ALF     A=B         SUBSCRIBER IN A,REG.
.436...A000561D020377              DL      377
.437...A000562D050402              TF      T,M         DISCONNECT FROM DMA MUX.
.438...A000563D030004              CL      RINGING     PUT DISCONNECT SUBSCRIBER INTO DISCONNECT
.439...A000564D050041              TF      A,A.T.      LOOP.TEST DISCONNECT SUBSCRIBER FOR RING.
.440...A000565D010052              RAMA    DEFECT      THESE 2 INSTRUCTIONS ALLOW A.T.
.441...A000566D050402              TF      T,M         TIME TO SETTLE.
.442...A000567D060456              CB      NEXTPOL     IF RINGING GO FIND NEW SUBSCRIBER TO POLL.
.443...A000570D050402              TF      T,M
.444...A000571D020017              DL      017         POLL 4 TIMES WITH 8 MILI SEC SPACING
.445...A000572D010051              RAMA    FAIL        INTERLEAVED.
.446...A000573D050402              TF      T,M         SET DISCONNECT PROCESS.
.447...A000574D010030              RAMA    ALLOCATE
.448...A000575D050104              TF      M,B         UPDATE ALLOCATE.
.449...A000576D040040              ALF     A=B+1
.450...A000577D050401              TF      A,M
.451...A000600D070060              B       CDDSEQRTN   RETURN TO CDD SEQUENCER.
.452...=------D000000              END
```

```
"*          PROTOTYPE SRS PROGRAM."
"*          USE BASE STATION CONTROL."
"*          AUTHOR IAN CHAPMAN."
"*          FARINON ELECTRIC OF CANADA,"
"*          657 ORLY AVE,"
"*          DORVAL H9P=1G1 ,"
"*          QUEBEC."
"*          DATE WRITTEN - 18 JAN 1974."
"*          UPDATED - 21 JUNE  1974."
"*          UPDATED -  4 MAY   1974."
"*          UPDATED - 16 APRIL 1974."
"*          UPDATED - 10 APRIL 1974."
"************************************************************"
"**
"**         EQUALS SECTION."
"**
"**
"CH0        EQU    0        "
"CH1        EQU    1        "
"CH2        EQU    2        "
"CH3        EQU    3        "
"CH4        EQU    4        "
```

```
"CH5        EQU    5        "
"CH6        EQU    6        "
"CH7        EQU    7        "
"CH8        EQU    10       "
"CH9        EQU    11       "
"CH10       EQU    12       "
"CH11       EQU    13       "
"CH12       EQU    14       "
"CH13       EQU    15       "
"CH14       EQU    16       "
"CH15       EQU    17       "
"I/OOUT     EQU    20       NEXT SUBSCRIBER TO BE POLLED."
"POLLING    EQU    21       SUBSCRIBER BEING POLLED."
"POLLED     EQU    22       PREVIOUS SUBSCRIBER POLLED."
"ALLOCATE   EQU    30       BECOMES 0 ON 15TH VF ALLOCATION."
"RINGFLAG   EQU    31       "
"MAINFLAG   EQU    32       "
"ATCOUNT    EQU    33       "
"I/OIN      EQU    34       "
"CONTCH     EQU    40       "
"ALARMCLK   EQU    41       ALARM CALCULATION EVERY 64 SECS."
"CONNECT    EQU    42       SUBSCRIBER REQUESTING VF CHANNEL."
"SPO        EQU    47       TEMPORARY STORAGE."
"POLLCOUNT  EQU    50       "
"FAIL       EQU    51       "
"DEFECT     EQU    52       "
"******************************************************************"
"*"
"*"
"*         EXECUTION SECTION."
"*"
"*"
"          ORG    0        "
"START     DL     0        "
"          ALF    A=0      "
"          CL     A=B      "
"LOOP1     TF     A,B,R    LOOP1 SETS ALL RAM TO 0."
"          TF     T,M      "
"          ALF    A=B+1    "
"          CB     $+2      256 LOCATION ?"
"          B      LOOP1    NO,- RETURN LOOP1."
"          DL     23       MEMORY CELLS 0 - 18 TO -1."
"          TF     T,B      "
"          DL     377      DECIMAL NEG 1."
"LOOP2     ALF    A=B-1    LOOP2 SETS CH0 - CH15 TO -1"
"          CB     QUIT2    THUS LOOP2 DISCONNECTS ALL SUBSCRIBERS VF."
"          TF     A,B,R    "
"          TF     T,M      "
"          B      LOOP2    "
"QUIT2     RAMA   ALLOCATE SET LOCATION ALLOCATE."
"          DL     16       DECIMAL POS 14."
"          TF     T,M      "
"          RAMA   MAINFLAG SET MAINFLAG."
"          DL     347      "
"          TF     T,M      "
"          RAMA   POLLCOUNT SET POLLCOUNTER."
"          DL     200      "
"          TF     T,M      "
"          RAMA   CH0      CHANNEL IS CONTROL CHANNEL ON START UP."
"          DL     0        "
"          TF     T,M      "
  NIT       RAMA   ATCOUNT  INITIALIZE CDO INTERFACE TEST ROUTINE.?"
"          DL     200      "
"          TF     T,B      "
  ESTER     ALF    A=B+1    "
"          CL     A=B      TEST FOR LAST SUBSCRIBER."
"          CB     INIT     REINIT AND RESTART CDO TEST SEQUENCE."
"          DL     177      SET MSB TO INDICATE ALARM STATUS"
"          TF     T,B      "
"          TF     A,M      OF SUBSCRIBER BEFORE TRANSFERING"
"          TF     A,T,R    "
"          ALF    A=B      ADDRESS CODE TO THE ADDRESSING TREE."
"          TF     M,B      "
"          ALF    OR       "
"          TF     T,B      "
"          ALF    AND      "
"          TF     A,A.T.   "
  ESTLOOP   CL     POLLING  CHECK FOR END OF POLL."
"          CB     REPOLL   IF END OF POLL THEN REPOLL."
"          CL     RINGING  YES SO TEST RINGER."
"          CB     RINGING  GOTO RINGING SERVICE ROUTINE."
 :DOSEQRTN  RAMA   ATCOUNT  "
"          TF     M,B      "
"          B      TESTER   NOT RINGING SO TEST NEXT ADDRESS."
```

```
REPOLL     RAMA POLLING    TRY TO CONNECT CURRENT SUBSCRIBER."
           TF   M,T          "
           RAMA CONNECT      "
           TF   T,M          "
           RAMA RINGFLAG   RESET RINGING FLAG."
           DL   0            "
           TF   T,M          "
POLENTER   RAMA I/OOUT     NEXT SUBSCRIBER TO BE POLLED."
           TF   M,T          "
           RAMA I/OIN      RINGING ENTERS HERE."
           TF   I/O,M      SAVE SUBSCRIBER RESPO..E."
           TF   T,I/O      SUBSCRIBER TO BE POLLED IN I/O BUFFER."
           RAMA CONTCH       "
           TF   M,CHAN     CONTROL CHANNEL TO I/O LOGIC."
           RAMA POLLING    UPDATE POLLED AND POLLING."
           TF   M,B          "
           TF   T,M          "
           ALF  A=B          "
           RAMA POLLED       "
           TF   A,M          "
RINGNOCON  RAMA RINGFLAG   RINGING FAILED TO CONNECT,TEST ON PREVIOUSLY"
           TF   M,B        POLLED SUBSCRIBER STARTS HERE."
           CL   B,NEG      IF RINGING BYPASS DUMMY TEST."
           CB   RADIOTST   ITS RINGING."
           CL   A=B        A HOLDS SUBSCRIBER JUST POLLED."
           CB   POLSEQU    LAST POLL WAS A DUMMY."
.*"
*"
RADIOLOG   RAMA CONNECT    PUT RADIO LOG OF SUBSCRIBER INTO"
           TF   M,T        A,REG,B,REG AND SPO."
           TF   T,R          "
           TF   M,B          "
           RAMA SPO          "
           ALF  A=B          "
           TF   A,M          "
           DL   010        IS THIS A LOG OF ON OR OFF HOOK RESPONCES ?"
           TF   T,B          "
           ALF  AND          "
           ALF  COMP         "
           CL   A=B          "
           RAMA I/OIN      PREPARE TO TEST CURRENT RESPONCE TO POLL."
           TF   M,B          "
           DL   376          "
           RAMA SPO          "
           CB   OFFHOOK    ITS A LOG OF OFF HOOK RESPONCE."
           ALF  A=B        CONTINUE TESTING CURRENT RESPONCE."
           TF   T,B          "
           ALF  OR           "
           CB   ONOFF      RECORDING ON HOOK NOW ITS OFF HOOK."
ONON       TF   M,B        RECORDING ON HOOK STILL ON HOOK."
           ALF  A=B        TEST LOG FOR FULL CONTINUITY."
           DL   370          "
           TF   T,B          "
           ALF  OR           "
           CB   LSTHKTST   CONTINIOUS SO BYPASS ANY UPDATE."
           TF   M,B        UP DATE LOG."
           ALF  A=B+1        "
RETNLOG    RAMA CONNECT    REPLACE LOG."
           TF   M,T          "
           TF   T,R          "
           TF   A,M          "
LSTHKTST   RAMA I/OIN      LAST HOOK TEST."
           TF   M,B          "
           ALF  A=B          "
           DL   376          "
           TF   T,B          "
           ALF  OR           "
           RAMA SPO        OLD LOG IN SPO."
           CB   TSTRADIO   SUBSCRIBER ON HOOK TO POLSEQU"
           B    POLSEQU      "
OFFHOOK    ALF  A=B        I/OIN IN A,REG."
           TF   T,B        376 IN B,REG."
           ALF  A=BORA       "
           CB   ONON       ACTUALLY ITS OFFOFF."
ONOFF      TF   M,B        ALSO OFFON."
           ALF  A=B        LOG IN A,REG."
           DL   370          "
           TF   T,B          "
           ALF  A=BANDA    CONTINUITY COUNTER SET TO ZERO."
           DL   010          "
           TF   T,B          "
           ALF  A=BEXORA   BIT4 REVERSED."
           B    RETNLOG    REPLACE UPDATED LOG."
RADIOTST   RAMA CONNECT    ENTERS HERE IF RINGING."
           TF   M,T          "
           TF   T,R          "
```

```
TSTRADIO  TF    M,B        ENTERS HERE IF OFF HOOK."
          ALF   A=B        LOG IN A,REG."
          DL    370        "
          CL    A=B        "
          TF    T,B        "
          ALF   A=BORA     "
          CB    ALTETST    GOTO ALLOCATE TEST."
POLSEQRTN RAMA  RINGFLAG   TEST RINGFLAG."
          TF    M,B        "
          ALF   A=B        "
          CB    $+2        "
          B     POLSEQU    IF NOT SET RETURN VIA POLSEQUENSER."
          DL    0          IF SET RETURN AND SERVICE LAST POLL."
          TF    T,M        POLLING A DUMMY NOW BUT PRIOR POLL WAS VALID."
          RAMA  POLLED     "
          TF    T,M        "
          RAMA  CONNECT    PUT PRIOR POLL INTO CONNECT."
          TF    T,M        "
          B     RINGNOCON  "
ALTETST   RAMA  ALLOCATE   ARE ALL 15 CHANNELS IN USE ?"
          TF    M,B        "
          ALF   A=B        "
          CB    POLSEQRTN  YES."
          DL    20         TEST IF ALREADY CONNECTED."
LOOP3     TF    T,B        "
          ALF   A=B-1      "
          CB    QUIT3      END OF LOOP START CONNECT SEQUENCE."
          TF    A,T,R      CHANNEL IN RAM ADDRESS."
          TF    M,B        "
          ALF   A=B        SUBSCRIBER ALLOCATED TO CHANNEL IN A,REG."
          RAMA  CONNECT    "
          TF    M,B        SUBSCRIBER TO BE CONNECTED IN B,REG."
          ALF   COMP       IS SUBSCRIBER IN THIS CHANNEL ?"
          CB    POLSEQRTN  ITS ALREADY CONNECTED."
          B     LOOP3      TEST NEXT CHANNEL."
"*"
"*"
QUIT3     CL    POLLING    END OF POLL ?"
          CB    FIRSTPOLL  YES."
          B     $-1        NO,TRY AGAIN."
RINGING   RAMA  CONNECT    RING SERVICE ROUTINE."
          TF    T,M        TRY TO CONNECT RINGING SUBSCRIBER."
          RAMA  RINGFLAG   SET RINGING FLAG."
          DL    377        "
          TF    T,M        "
          RAMA  POLLING    "
          CL    POLLING    "
          CB    POLENTER   T,REG HOLDS 377 DUMMY."
          B     $-1        NOT END OF POLL TRY AGAIN."
FIRSTPOLL RAMA  CONNECT    REPOLL WITH FIRST CONNECT POLL."
          TF    M,I/O      "
          RAMA  CONTCH     "
          TF    M,CHAN     "
          RAMA  RINGFLAG   RINGFLAG IN B,REG."
          TF    M,B        AND INTO A,REG "
          ALF   A=B        "
          CL    POLLING    END OF POLL ?"
          CB    $+2        "
          B     $-1        NO,TRY AGAIN."
          CL    A=B        YES."
          CB    2NDPOLL    RINGING FLAG SGT."
          TF    I/O,B      NO,SO TEST OFF HOOK RESPONCE."
          ALF   A=B        "
          DL    376        "
          TF    T,B        "
          ALF   OR         "
          CB    2NDPOLL    "
          B     REPOLRTN   ITS ON HOCK SO RETURN VIA REPOLRTN."
2NDPOLL   RAMA  CONNECT    ITS OFF HOOK SO POLL AGAIN."
          TF    M,I/O      "
          RAMA  CONTCH     "
          TF    M,CHAN     "
          DL    20         TO FIND NEW CONTROL CHANNEL."
LOOP4     TF    T,B        DEC 16 IN B,REG ON START UP."
          ALF   A=B-1      DECREMENT AND TEST NEXT CHANNEL."
          TF    A,T,R      "
          CB    START      TESTED ALL 16 CHANNELS ! ALL IN USE,"
          TF    M,B        HENCE THERE IS AN ALLOCATION ERROR."
          ALF   A=B        NEXT CHANNEL IN A,REG."
          CB    QUIT4      THIS CHANNEL IS EMPTY."
          B     LOOP4      "
QUIT4     RAMA  SPO        SAVE NEW CONTROL CHANNEL IN SPO."
          TF    T,M        "
          RAMA  RINGFLAG   PUT RINGFLAG IN A,REG."
          TF    M,B        "
```

```
 "          ALF   A=B           "
 "          CL    POLLING       WAIT FOR END OF 2ND POLL."
 "          CB    $+2           "
 "          B     $-1           "
 "          CL    A=B           "
 "          CB    CONSUB        IF RINGFLAG CONNECT."
 "          TF    I/O,B         OTHERWISE TEST HOOK RESPONCE."
 "          ALF   A=B           STILL OFF HOOK THEN CONNECT."
 "          DL    376           "
 "          TF    T,B           "
 "          ALF   OR            "
 "          CB    CONSUB        "
"REPOLRTN   DL    377           "
 "          RAMA  POLLING       SET POLLING TO DUMMY."
 "          TF    T,M           "
 "          B     REPOLL        AND START NEXT POLL PER I/OOUT."
"*"
"*"
"CONSUB     RAMA  POLLING       377 IN A,REG ON ENTRY."
 "          TF    A,M,I/O       SET UP A DUMMY POLL."
 "          RAMA  SPO           SPO HOLDS NEW CONTROL CHANNEL."
 "          TF    M,T           NEEW CONTROL CHANNEL IN T,REG."
 "          RAMA  CONTCH        "
 "          TF    M,B           OLD CONTROL CHANNEL IN B,REG."
 "          TF    T,M           SAVE NEW CONTROL CHANNEL."
 "          ALF   A=B           OLD CONTR=OL CHANNEL IN A,REG."
 "          ALF   A=B           OLD CONTROL CHANNEL IN A,REG."
 "          RAMA  CONNECT       "
 "          TF    M,T           SUBSCRIBER TOBE CONNECTED IN T,REG."
 "          TF    A,R           OLD CONTROL CHANNEL IN RAM ADDRESS."
 "          TF    T,M           SUBSCRIBER CONNECTED TO DMA MUX SWITCHES."
 "          TF    T,R           SET NEW SUBSCRIBER RADIO LOG"
 "          DL    17            TO CONSISTENTLY OFF HOOK."
 "          TF    T,M           "
 "          CL    SLOT          TO CHANGE CHANNEL - WAIT UNTILL -"
 "          RAMA  CONTCH        OLD CONT CHANLESS 1,THUS ALL SUBSCRIBER"
 "          TF    M,T           STATIONS WILL GO WIDE BANDAND BE ABLE TO"
 "          TF    T,R           ACCEPT THE EXPUL ON THE NEW CHANNEL."
 "          ALF   A=0           THE EXPUL MUST NOT ARRIVE BEFORE WIDEBAND."
 "          CB    $             TRAPPED HERE UNTILL OLD CONT CHAN LESS 1."
 "          TF    T,CHAN        NEW CONTROL CHANNEL TO I/O."
 "          TF    A,M           INHIBIT MUX SWITCHES ON CONT CHAN."
 "          RAMA  ALLOCATE      "
 "          TF    M,B           "
 "          ALF   A=B-1         UPDATE ALLOCATE."
 "          TF    A,M           "
 "          RAMA  DEFECT        IS SUBSCRIBER CONNECTED IN THE DISCONNECT"
 "          TF    M,B           LOOP ?"
 "          ALF   A=B           "
 "          RAMA  CONNECT       "
 "          TF    M,B           "
 "          CL    A=B           "
 "          ALF   COMP          "
 "          CB    $+2           "
 "          B     CDOSEQRTN     NO."
 "          RAMA  FAIL          YES SO REMOVE IT FROM THE DISCONNECT LOOP."
 "          DL    0             "
 "          TF    T,M           "
 "          B     CDOSEQRTN     "
"*"
"*"
"*"
"POLSEQU    RAMA  FAIL          IS A DISCONNECT IN PROGRESS ?"
 "          TF    M,B           "
 "          ALF   A=B-1         "
 "          CL    A=B           "
 "          CB    NEXTPOL       "
 "          TF    A,M           A DISCONNECT IS IN PROGRESS."
 "          DL    374           SHOULD IT BE POLLED NEXT POLL ?"
 "          TF    T,B           "
 "          ALF   OR            "
 "          CB    $+2           "
 "          B     NEXTPOL       NO,CARRY ON IN NORMAL POLLING SEQUENCE."
 "          RAMA  DEFECT        YES,POLL DISCONNECTION."
 "          TF    M,T           "
 "          RAMA  I/OOUT        "
 "          TF    T,M           "
"ALLOTED    DL    20            BEFORE POLLING TEST TO SEE IF ALREADY."
"LOOPS      TF    T,B           ALLOCATED."
 "          ALF   A=B-1         "
 "          CB    CDOSEQRTN     ITS NOT CONNECTED."
 "          TF    A,T,R         "
 "          TF    M,B           "
 "          ALF   A=B           "
 "          RAMA  I/OOUT        "
 "          TF    M,B           "
 "          ALF   COMP          "
```

```
"           CB    CARRTEST     YES,ITS ALLOCATED."
"           B     LOOP5        "
"NEXTPOL    RAMA  POLLCOUNT    CARRIER WAS OK SO TRY TO FIND A"
"           TF    M,B          SUBSCRIBER TO POLL."
"           ALF   A=B+1        "
"           CL    A=B          LAST SUBSCRIBER IN SEQUENCE #128 ?"
"           CB    ALARMEXEC    "
"           TF    A,M          NO SO TRY TO POLL IT,BUT TEST II FIRST."
"           RAMA  I/OOUT       SUBSCRIBER IN I/OOUT."
"           TF    A,M          "
"           B     ALLOTED      "
"ALARMEXEC  DL    200          SHORT ALARM ROUTINE."
"           TF    T,M          MORE ADVANCED ROUTINE WILL BE PRODUCED"
"           DATA  051010       PANEL SWITCHES TO RAMA"
"           DATA  150004       M TO PANEL"
"           RAMA  ALARMCLK     TEST FOR ALARM UPDATE."
"           TF    M,B          "
"           ALF   A=B+1        "
"           TF    A,M          "
"           CB    $+2          "
"           B     NEXTPOL      NORMAL POLL CYCLE."
"           DL    200          UPDATE ALARM INFORMATION IN RADIO LOGS."
"           RAMA  SPO          INITILISE CALCULATION POINTER."
"           TF    T,M          SPO USED AS POINTER."
"LOOP6      RAMA  SPO          "
"           CL    A=B          "
"           TF    M,B          "
"           ALF   A=B+1        POINT TO NEXT RADIO LOG."
"           DL    370          MASK FOR RADIO LOG LAST 3 BITS."
"           TF    T,B          MASK IN B,REG."
"           TF    A,M,T        POINTER IN T,REG AND SPO."
"           TF    A,R          RAMA SET TO POINTER."
"           CB    QUIT6        QUIT LOOP6."
"           ALF   A=B          MASK IN A,REG."
"           TF    M,B          RADIO LOG IN B,REG."
"           ALF   OR           370 OR RADIO LOG IN A,REG."
"           CB    $+2          A,REG IS 377 HENCE RADIO WAS OK."
"           CL    B,NEG        B,REG HOLDS SUBSCRIBER RADIO LOG."
"           CB    TSTPOL       BYPASS IF ALARM STILL SET."
"           ALF   A=B          ROUTINE TO GENERATE THE ALARM."
"           DL    100          FIRST ENTRY SET BIT 6."
"           TF    T,B          SECOND ENTRY SET BIT 7,GIVING ALARM STATUS."
"           ALF   A=B+A        THIRD IS BYPASSED."
"           B     SETALMRTN    RETURN TO LOOP6."
"SETBPASS   ALF   A=B          RESTORE RADIO LOG."
"           DL    017          "
"           TF    T,B          KILL ANY ALARM."
"           ALF   AND          "
"SETALMRTN  TF    A,M          "
"TSTPOL     CL    POLLING      IF END OF POLL,START A DUMMY POLL"
"           CB    CALPOLEND    TO OBTAIN CALCULATION TIME."
"           B     LOOP6        END OF LOOP."
"QUIT6      CL    POLLING      T,REG HOLDS 377 ON ENTRY FROM LOOP6."
"           CB    $+2          "
"           B     $-1          T,REG STILL 377."
"CALPOLEND  RAMA  POLLING      T,REG HOLDS 017 ON ENTRY FROM LOOP6."
"           ALF   A=-1         DUMMY POLL."
"           TF    A,I/O,M      "
"           RAMA  CONTCH       "
"           TF    M,CHAN       ON NORMAL CONTROL CHANNEL."
"           TF    T,B          T,REG HOLD 377 IF END OF LOOP6."
"           ALF   A=B          T,REG HOLD 017 IF NOT END OF LOOP6."
"           CL    A=B          "
"           CB    NEXTPOL      NOT END OF LOOP."
"           B     LOOP6        END OF LOOP."
"CARRTEST   TF    T,R          RAM ADDRESS STILL SET TO CONNECTED CHANNEL."
"           CL    CARRIER      "
"           CB    NEXTPOL      "
"           ALF   A=B          SUBSCRIBER IN A,REG."
"           DL    377          "
"           TF    T,M          DISCONNECT FROM DMA MUX."
"           CL    RINGING      PUT DISCONNECT SUBSCRIBER INTO DISCONNECT"
"           TF    A,A+T.       LOOP.TEST DISCONNECT SUBSCRIBER FOR RING."
"           RAMA  DEFECT       THESE 2 INSTRUCTIONS ALLOW A+T."
"           TF    T,M          TIME TO SETTLE."
"           CB    NEXTPOL      IF RINGING GO FIND NEW SUBSCRIBER TO POLL."
"           TF    T,M          "
"           DL    017          POLL 4 TIMES WITH 8 MILI SEC SPACING"
"           RAMA  FAIL         INTERLEAVED."
"           TF    T,M          SET DISCONNECT PROCESS."
"           RAMA  ALLOCATE     "
"           TF    M,B          UPDATE ALLOCATE."
"           ALF   A=B+1        "
"           TF    A,M          "
"           B     CDOSEQRTN    RETURN TO CDO SEQUENCER."
"           END                "
```

We claim:

1. A multipoint information distribution system comprising a central station and a plurality of physically separated outlying stations, each outlying station comprising at least one terminating circuit whereby said system comprises a plurality of terminating circuits;

said central station comprising a plurality of connecting ports equal in number to the plurality of terminating circuits;

and means for coupling selected ones of said terminating circuits to selected ones of said connecting ports one at a time;

characterized in that said coupling means comprises means including a multiplexer means at said central station for time sampling contents of said connecting ports in an ordered sequence during cyclically recurring time slots to provide, at an output of said multiplexer means, a first sequentially ordered sample stream;

transmission means at said central station for sending said sample stream directly and in common to each outlying station on a first medium whereby identical sample streams are sent to each outlying station;

receiving means at each outlying station adapted to receive said sample streams;

control means at each outlying station coupled to said receiving means to permit only samples in preselected time slots to be applied to selected terminating circuits at said outlying station;

transmission means at each said outlying station; and means for providing a signal to said transmission means;

said control means comprising means for gating said transmission means only during the preselected time slots of their respective terminating circuits to thereby provide samples of said signal, whereby each outlying station transmits, on a second medium, samples of the signal provided to their respective transmission means;

said outlying stations comprising means for arranging the transmission time slots at each station relative to one another so that samples will arrive at a receiving means of the central station in a second sequentially ordered sample stream;

distributor means comprising a demultiplexer means at said central station connected to an output of said receiving means and adapted to distribute said time distributed samples into their respective connecting ports;

said central station further comprising traffic control logic (TCL) means;

said TCL being adapted to poll the outlying stations in a predetermined sequence and in an unoccupied time slot selected at random by the TCL, to determine the circuit demand status of each outlying station;

said TCL being still further adapted to provide a communications channel, in said unoccupied time slot, between a respective terminating circuit and the central station when it detects a circuit demand condition at the terminating circuit or connecting port;

and means at said terminating circuit for locking its receiver means and transmitter means onto said unoccupied time slot;

said TCL further comprising means for selecting another unoccupied time slot for further polling of the uncommitted outlying stations.

2. A system as defined in claim 1 wherein the number of time slots in each cycle is equal to or greater than the plurality of connecting ports;

and wherein each connecting port is associated with a respective one of said time slots in each cycle;

said plurality of terminating circuits being equal to the plurality of connecting ports;

a separate time slot being dedicated to each terminating circuit;

said control means being adapted to permit only samples of the signal in the respective time slots of each terminating circuit to be presented to the respective terminating circuit;

said control means being further adapted to gate the transmitter of a respective terminating circuit only during the time slot of the respective terminating circuit;

whereby each connecting port is coupled with its respective terminating circuit via its respective time slot.

3. A system as defined in claim 1 wherein the number of time slots in each cycle is less than the plurality of connecting ports;

said plurality of terminating circuits being equal to said plurality of connecting ports;

said central station further comprising traffic control logic (TCL) means;

said TCL being adapted to provide a communications channel, in a predetermined time slot, between a respective terminating circuit and the central station when it detects a circuit demand condition at the terminating circuit;

and means at said terminating circuit for locking its receiver means and transmitter means onto said predetermined time slot.

4. A system as defined in claim 1 wherein said first channel comprises a radio wave at a first frequency, and wherein said second channel comprises a radio wave at a second frequency.

5. A system as defined in claim 1 wherein said multipoint information distribution system comprises a data distribution system, each said outlying stations comprising subscriber stations having at least one data circuit, and wherein said central station comprises a base station associated with a number of data lines.

6. A system as defined in claim 1 wherein said multipoint information distribution system comprises a telephone subscriber distribution system, each said outlying station comprising subscriber stations having at least one telephone, and wherein said central station comprises a base station associated with a Community Dial Office (CDO), and wherein the number of time slots in each cycle is equal to or greater than the plurality of connecting ports;

and wherein each connecting port is associated with a respective one of said time slots in each cycle;

said plurality of terminating circuits being equal to the plurality of connecting ports;

a separate time slot being dedicated to each terminating circuit;

said control means being adapted to permit only samples of the signal in the respective time slots of each terminating circuit to be presented to the respective terminating circuit;

said control means being further adapted to gate the transmitter of a respective terminating circuit only during the time slot of the respective terminating circuit;

whereby each connecting port is coupled with its respective terminating circuit via its respective time slot.

7. A system as defined in claim 1 wherein said multipoint information distribution system comprises a telephone subscriber distribution system, each said outlying station comprising subscriber stations having at least one telephone, and wherein said central station comprises a base station associated with a Community Dial Office, (CDO), and wherein the number of time slots in each cycle is less than the plurality of connecting ports;

said plurality of terminating circuits being equal to said plurality of connecting ports;

said base station further comprising traffic control logic (TCL) means;

said TCL being adapted to check the ringing status of a respective terminating circuit from the CDO;

said TCL being further adapted to provide a communications channel, in one of said time slots, between said respective terminating circuit and the CDO when it detects either ringing of the respective terminating circuit from the CDO or an OFF hook condition at said respective terminating circuit;

and means at said terminating circuit for locking its receiver means and transmitter means onto said one time slot when allocated for communications;

whereby any one of said connecting circuits is connectable to its respective terminating circuit by one of said time slots, selected at random by the TCL.

8. A rural subscriber telephone system comprising a central station and a plurality of physically separated outlying stations, each outlying station comprising at least one terminating circuit whereby said system comprises a plurality of terminating circuits;

said central station comprising a plurality of connecting ports;

and means for coupling selected ones of said terminating circuits to selected ones of said connecting ports one at a time;

characterized in that said coupling means comprises;

means at said central station for time sampling contents of said connecting ports in an ordered sequence during cyclically recurring time slots to provide, at an output of said time sampling means, a first sequentially ordered sample stream;

transmission means at said central station for sending said sample stream directly and in common to each outlying station on a first channel whereby identical sample streams are sent to each outlying station;

receiving means at each said outlying stations adapted to receive said sample streams;

control means at each said outlying stations, coupled to said receiving means to permit only samples in a preselected time slot to be applied to selected terminating circuits at said outlying stations;

transmission means at each said outlying station; and means for providing a signal to said transmission means;

said control means comprising means for gating said transmission means only during the preselected time slots of their respective terminating circuits to thereby provide samples of said signal, whereby each outlying station transmits, on a second channel, samples of the signal provided to their respective transmission means;

said outlying stations comprising means for arranging the transmission time slots at each station relative to one another so that samples will arrive at a receiving means of said central station in a second sequentially ordered sample stream; and distributor means at said central station connected to an output of said receiving means and adapted to distribute said time distributed samples into their respective connecting ports, and wherein said time sampling means comprises a multiplexer means;

and wherein said distributor means comprises a demultiplexer means;

wherein said rural subscriber telephone system comprises a telephone subscriber distribution system, each said outlying stations comprising subscriber stations having at least one telephone, and wherein said central station comprises a base station associated with a Community Dial Office (CDO); and wherein the number of time slots in each cycle is less than the plurality of connecting ports;

said plurality of terminating circuits being equal to said plurality of connecting ports;

said base station further comprising traffic control logic (TCL) means;

said TCL being adapted to check the ringing status of a respective terminating circuit from the CDO;

said TCL being further adapted to poll the outlying stations in a predetermined sequence and in an unoccupied time slot selected at random by the TCL, to determine the hook condition at each respective terminating circuit in each outlying station;

said TCL being further adapted to provide a communications channel, in one of said time slots, between said respective terminating circuit and the CDO when it detects either ringing of the respective terminating circuit from the CDO or an OFF hook condition at said respective terminating circuit;

and means at said terminating circuit for locking its receiver means and transmitter means onto said one time slot when allocated for communication;

whereby any one of said connecting circuits is connectable to its respective terminating circuit by any one of said time slots, selected at random by the TCL.

9. A system as defined in claim 8 wherein said first channel comprises a radio wave at a first frequency, and wherein said second channel comprises a radio wave at a second frequency.

10. A rural subscriber telephone system comprising a central station and a plurality of physically separated outlying stations, each outlying station comprising at least one terminating circuit whereby said system comprises a plurality of terminating circuits;

said central station comprising a plurality of connecting ports;

and means for coupling selected ones of said terminating circuits to selected ones of said connecting ports one at a time;

characterized in that said coupling means comprises;

means at said central station for time sampling contents of said connecting ports in an ordered sequence during cyclically recurring time slots to provide, at an output of said time sampling means, a first sequentially ordered sample stream;

transmission means at said central station for sending said sample stream directly and in common to each outlying station on a first channel whereby identical sample streams are sent to each outlying station;

receiving means at each said outlying stations adapted to receive said sample streams;

control means at each said outlying stations, coupled to said receiving means to permit only samples in a preselected time slot to be applied to selected terminating circuits at said outlying stations;

transmission means at each said outlying station; and means for providing a signal to said transmission means;

said control means comprising means for gating said transmission means only during the preselected time slots of their respective terminating circuits to thereby provide samples of said signal, whereby each outlying station transmits, on a second channel, samples of the signal provided to their respective transmission means;

said outlying stations comprising means for arranging the transmission time slots at each station relative to one another so that samples will arrive at a receiving means of said central station in a second sequentially ordered sample stream; and distributor means at said central station connected to an output of said receiving means and adapted to distribute said time distributed samples into their respective connecting ports, and wherein said time sampling means comprises a multiplexer means;

and wherein said distributor means comprises a demultiplexer means;

wherein said rural subscriber telephone system comprises a data distribution system, each said outlying stations comprising subscriber stations having at least one data circuit, and wherein said central station comprises a base station associated with a number of data lines;

wherein the number of time slots in each cycle is less than the plurality of connecting ports and wherein the number of data lines comprises a data exchange;

said plurality of terminating circuits being equal to said plurality of connecting ports;

said base station further comprising traffic control logic (TCL) means;

said TCL being adapted to check the signalling status of a respective terminating circuit from the data exchange;

said TCL being adapted to poll the outlying stations in a predetermined sequence and in an unoccupied time slot selected at random by the TCL, to determine the circuit demand status of each outlying station;

said TCL being further adapted to provide a communications channel, in one of said time slots, between said respective terminating circuit and the data exchange when it detects either signalling of the respective terminating circuit from the data exchange or an appropriate signalling condition for said respective terminating circuit;

and means at said terminating circuit for locking its receiver means and transmitter means onto said one time slot when allocated for communications;

said TCL further comprising means for selecting another unoccupied time slot for further polling of the uncommitted outlying stations.

11. A system as defined in claim 10 wherein said first channel comprises a radio wave at a first frequency, and wherein said second channel comprises a radio wave at a second frequency.

12. A rural subscriber telephone system comprising a central station and a plurality of outlying stations located at varying distances from the central station each outlying station comprising at least one terminating circuit whereby said system comprises a plurality of terminating circuits;

said central station comprising a plurality of connecting ports;

and means for coupling selected ones of said terminating circuits to selected ones of said connecting ports one at a time;

characterized in that said coupling means comprises;

means at said central station for time sampling contents of said connecting ports in an ordered sequence during cyclically recurring time slots to provide, at an output of said time sampling means, a first sequentially ordered sample stream;

transmission means at said central station for sending said sample stream directly and in common to each outlying station on a first channel whereby identical sample streams are sent to each outlying station;

receiving means at each said outlying station adapted to receive said sample streams;

control means at each said outlying station coupled to said receiving means for gating samples in preselected time slots to selected terminating circuits as said samples arrive at said outlying station, transmission means at each said outlying station; and means for providing a signal to said transmission means;

said control means comprising means for gating said transmission means during the applied preselected time slots of their respective terminating circuits to thereby provide samples of said signal, whereby each outlying station transmits, on a second channel, samples of the signal provided to their respective transmission means;

said outlying stations comprising means for advancing the transmission of samples for time periods proportional to respective distances thereof from the central station, so that samples will arrive from all transmitting outlying stations at a receiving means of said central station in a second sequentially ordered sample stream;

distributor means at said central station connected to an output of said receiving means and adapted to distribute said time distributed samples into their respective connecting ports, and wherein the number of time slots in each cycle is less than the plurality of connecting ports;

said plurality of terminating circuits being equal to said plurality of connecting ports;

said central station further comprising traffic control logic (TCL) means;

said TCL being adapted to poll the outlying stations in a predetermined sequence and in an unoccupied time slot selected at random by the TCL, to determine the circuit demand status of each outlying station;

said TCL being still further adapted to provide a communications channel, in said unoccupied time slot, between a respective terminating circuit and the central station when it detects a circuit demand condition at the terminating circuit or connecting port;

and means at said terminating circuit for locking its receiver means and transmitter means onto said unoccupied time slot;

said TCL further comprising means for selecting another unoccupied time slot for further polling of the uncommitted outlying stations.

13. A system as defined in claim 12 wherein said first channel comprises a radio wave at a first frequency, and wherein said second channel comprises a radio wave at a second frequency.

14. A system as defined in claim 12 wherein said time sampling means comprises a multiplexer means, said distributor means comprises a demultiplexer means and said second sequentially ordered sample stream is in the same sequence as said first sequentially ordered sample stream.

* * * * *